United States Patent
Yamanashi

[11] Patent Number: 5,808,808
[45] Date of Patent: Sep. 15, 1998

[54] WIDE-ANGLE LENS SYSTEM

[75] Inventor: Takanori Yamanashi, Kokubunji, Japan

[73] Assignee: Olympus Optical Co., Ltd., Toyko, Japan

[21] Appl. No.: 649,488

[22] Filed: May 17, 1996

[30] Foreign Application Priority Data

May 19, 1995 [JP] Japan .................................... 7-121635

[51] Int. Cl.⁶ ............................. G02B 15/14; G02B 3/02; G02B 13/06; G02B 3/08
[52] U.S. Cl. .......................... 359/682; 359/689; 359/716; 359/725; 359/740
[58] Field of Search .................... 359/689, 716, 359/740, 753, 784, 725, 682

[56] References Cited

U.S. PATENT DOCUMENTS

| | | | |
|---|---|---|---|
| 2,721,499 | 10/1955 | Bertele | 359/770 |
| 2,734,423 | 2/1956 | Bertele | 359/754 |
| 2,781,695 | 2/1957 | Klemt | 359/753 |
| 2,897,725 | 8/1959 | Klemt et al. | 359/660 |
| 3,209,649 | 10/1965 | Macher | 359/753 |
| 3,447,861 | 6/1969 | Schlegel | 359/753 |
| 3,661,447 | 5/1972 | Glatzel et al. | 359/784 |
| 3,700,312 | 10/1972 | Bertele | 359/762 |
| 3,825,321 | 7/1974 | Takahashi | 359/761 |
| 3,829,198 | 8/1974 | Takahashi | 359/753 |
| 3,833,290 | 9/1974 | Glatzel et al. | 359/755 |
| 3,951,523 | 4/1976 | Nishimoto | 359/716 |
| 3,997,247 | 12/1976 | Glatzel et al. | 359/754 |
| 3,998,527 | 12/1976 | Ikeda et al. | 359/716 |
| 4,013,349 | 3/1977 | Bertele et al. | 359/755 |
| 4,176,915 | 12/1979 | Mori | 359/753 |
| 4,730,907 | 3/1988 | Kikuchi et al. | 359/689 |
| 5,315,441 | 5/1994 | Hori et al. | 359/753 |
| 5,461,512 | 10/1995 | Ruben | 359/689 |
| 5,528,428 | 6/1996 | Ohtake et al. | 359/684 |
| 5,621,575 | 4/1997 | Toyama | 359/753 |

FOREIGN PATENT DOCUMENTS

406230286 A  8/1994  Japan ..................................... 359/689

*Primary Examiner*—Georgia Y. Epps
*Assistant Examiner*—Evelyn A. Lester
*Attorney, Agent, or Firm*—Cushman Darby & Cushman IP Group of Pillsbury Madison & Sutro LLP

[57] ABSTRACT

The invention provides an ultrawide-angle yet large aperture ratio lens system of the symmetrical type which, while taking aim at improving the vignetting factor and the performance of a sagittal image surface, achieves a field angle coverage of up to about 107° and an aperture ratio of about 1:2.8 to 3.5, and which comprises a first group G1 of negative power, a second group G2 of positive power and a third group G3 of negative power. The first group G1 comprises at least one negative meniscus lens convex on an object side, the second group G2 comprises an aperture stop and one set of cemented lens, and the third group G3 comprises at least one negative meniscus lens convex on an image side, with an aspherical surface used in any one of the lens groups. Specific conditions for the refracting power ratio between the first and second groups G1 and G2, the refracting power ratio between the third and second groups G3 and G2, and the axial distance between the first and second groups G1 and G2 are satisfied. Focusing is effected by floating as well.

5 Claims, 17 Drawing Sheets

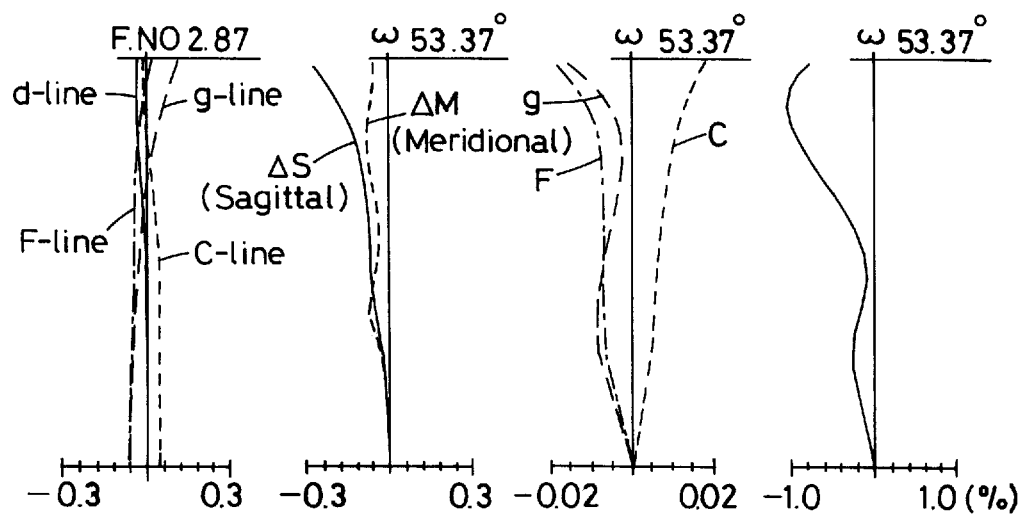
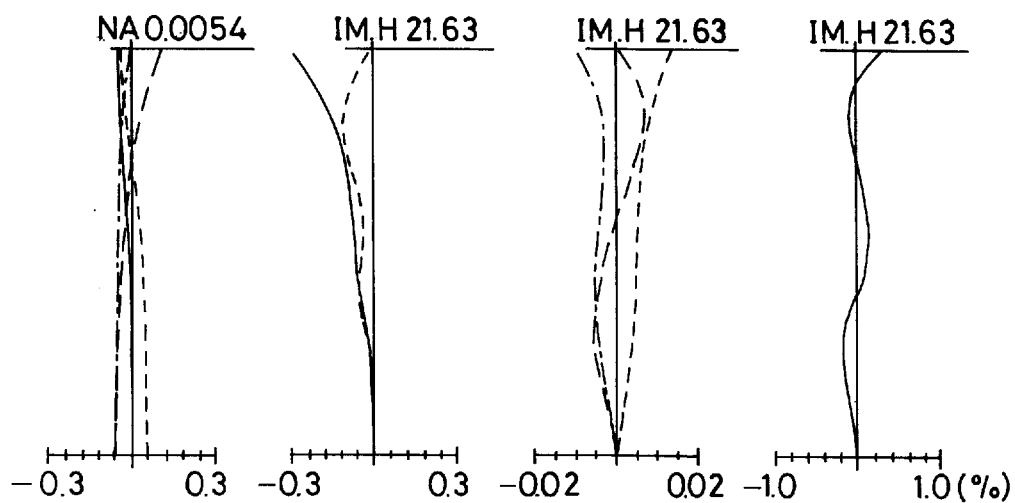

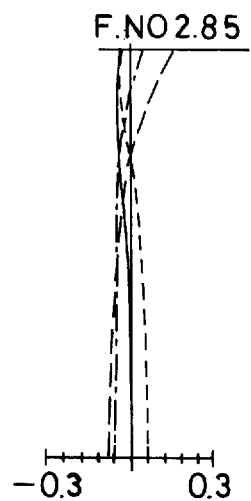
FIG.7(a)
F.NO 2.85
-0.3  0.3
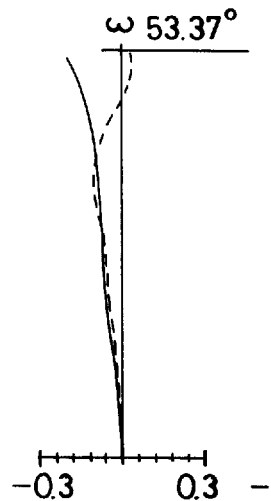
FIG.7(b)
ω 53.37°
-0.3  0.3
FIG.7(c)
ω 53.37°
-0.02  0.02
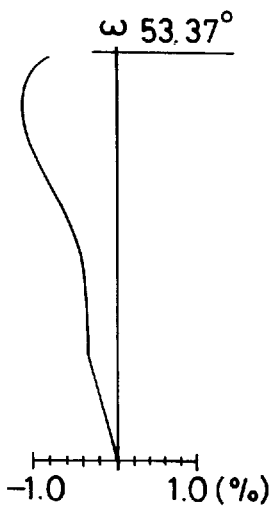
FIG.7(d)
ω 53.37°
-1.0  1.0(%)
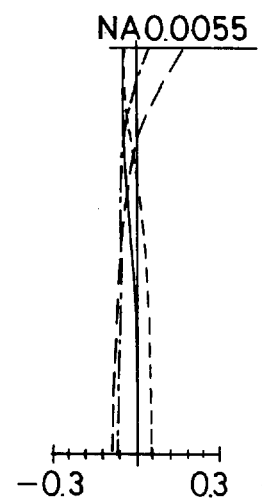
FIG.7(e)
NA 0.0055
-0.3  0.3
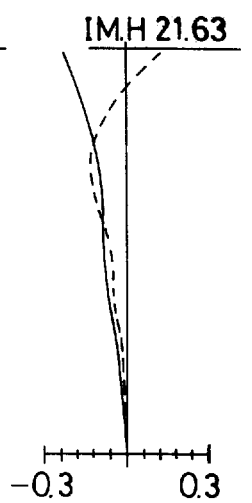
FIG.7(f)
IM.H 21.63
-0.3  0.3
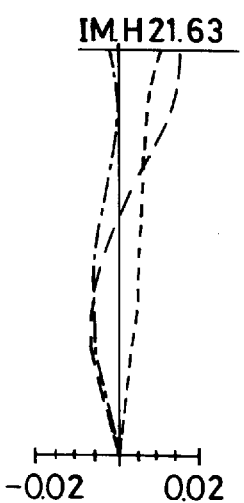
FIG.7(g)
IM.H 21.63
-0.02  0.02
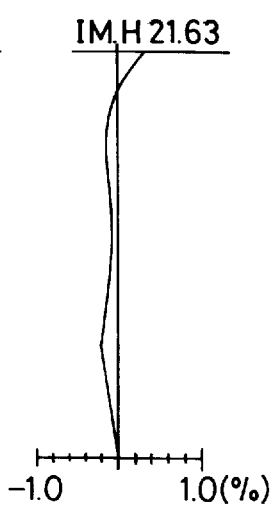
FIG.7(h)
IM.H 21.63
-1.0  1.0(%)

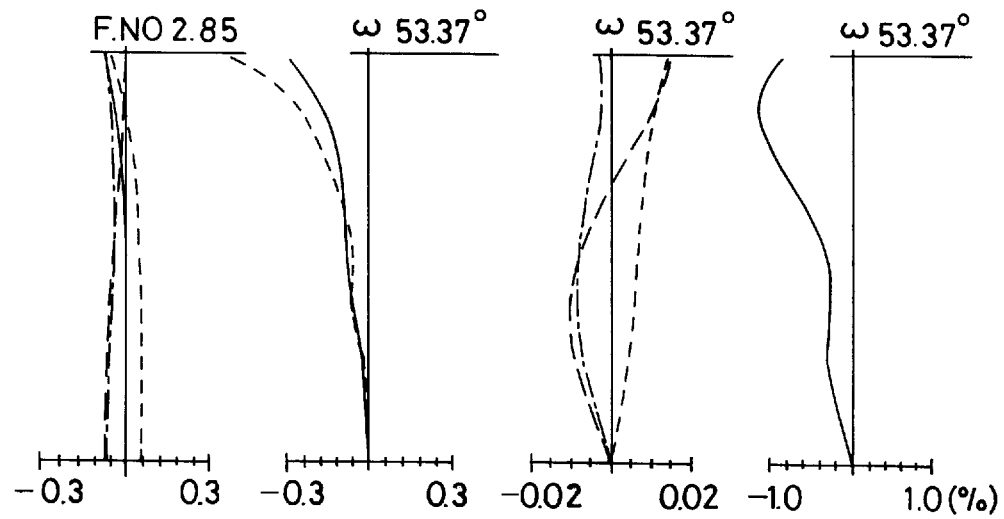

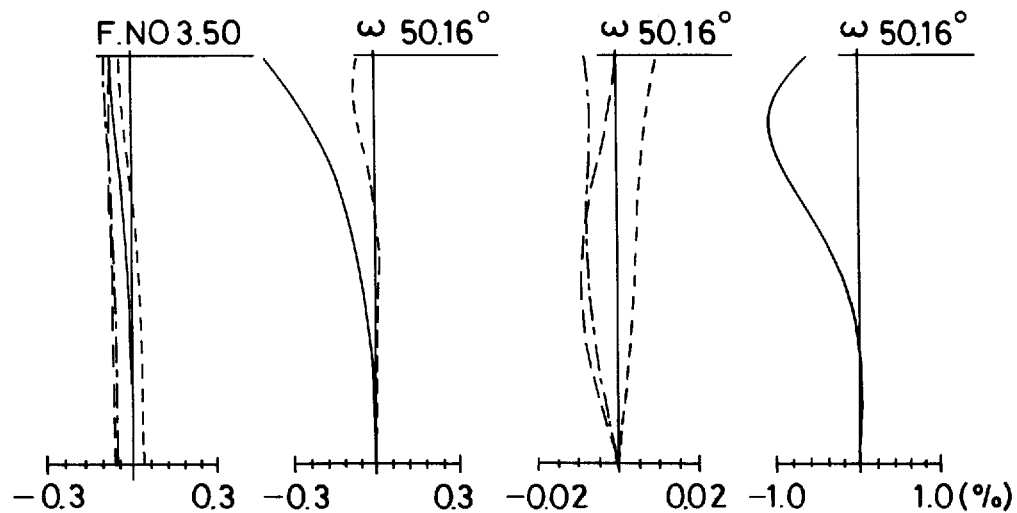
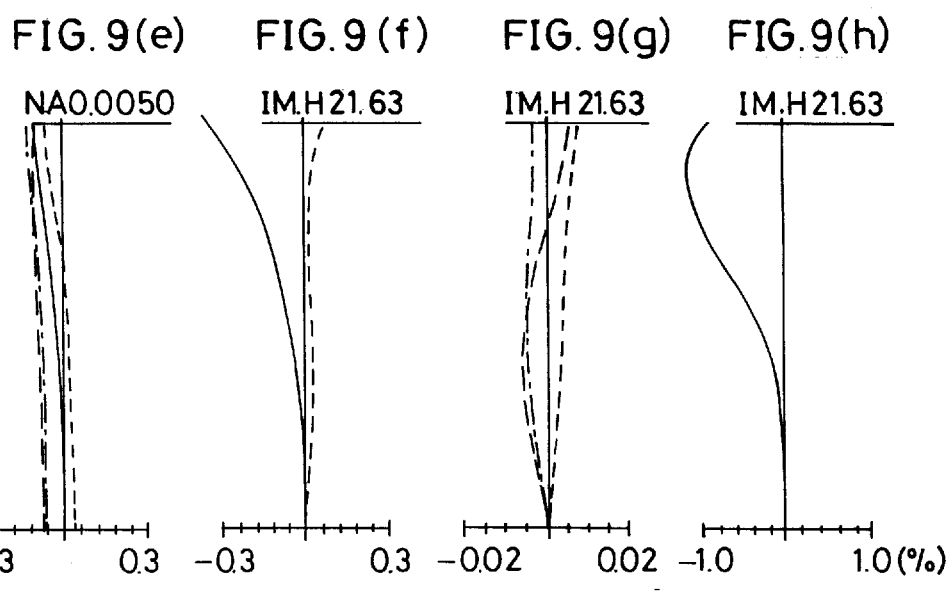

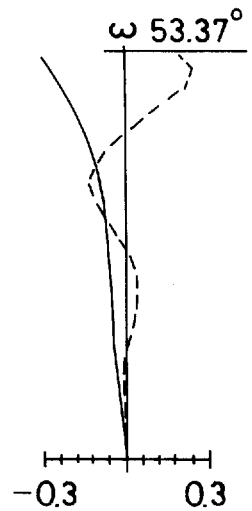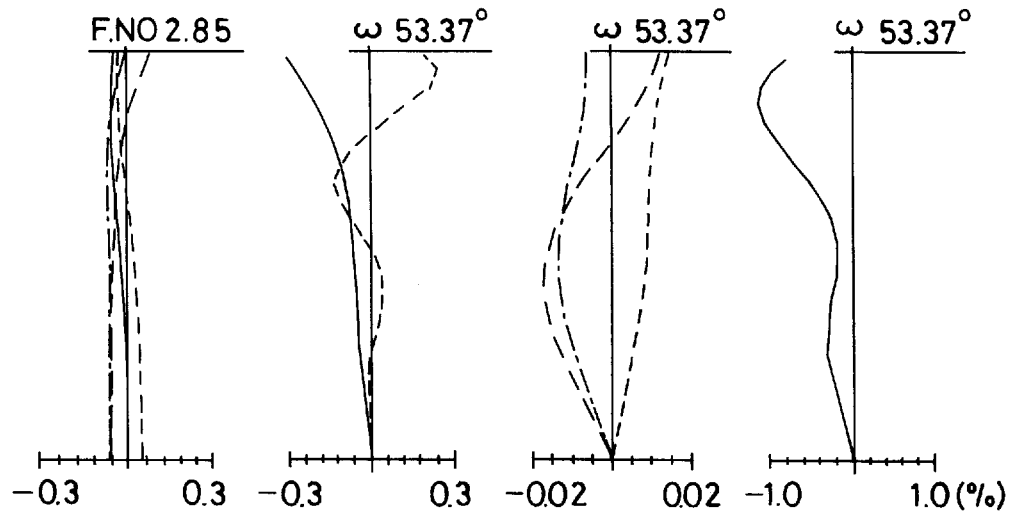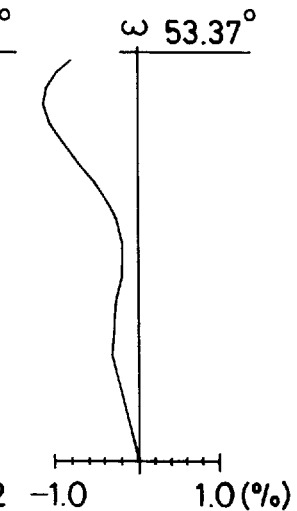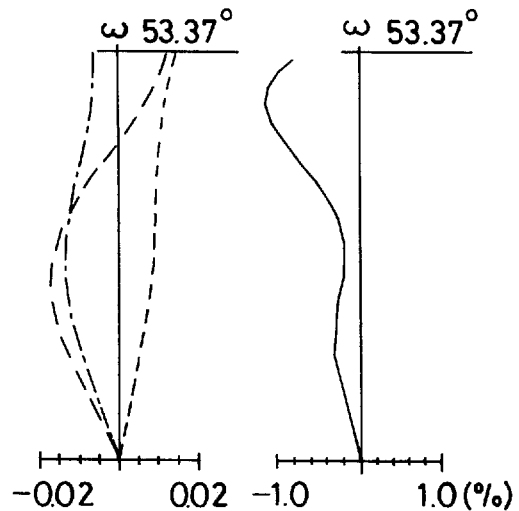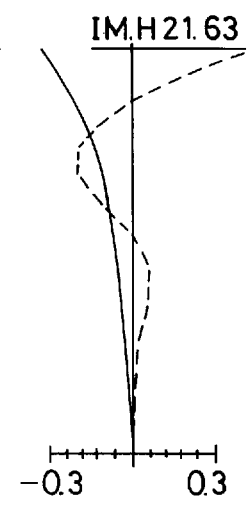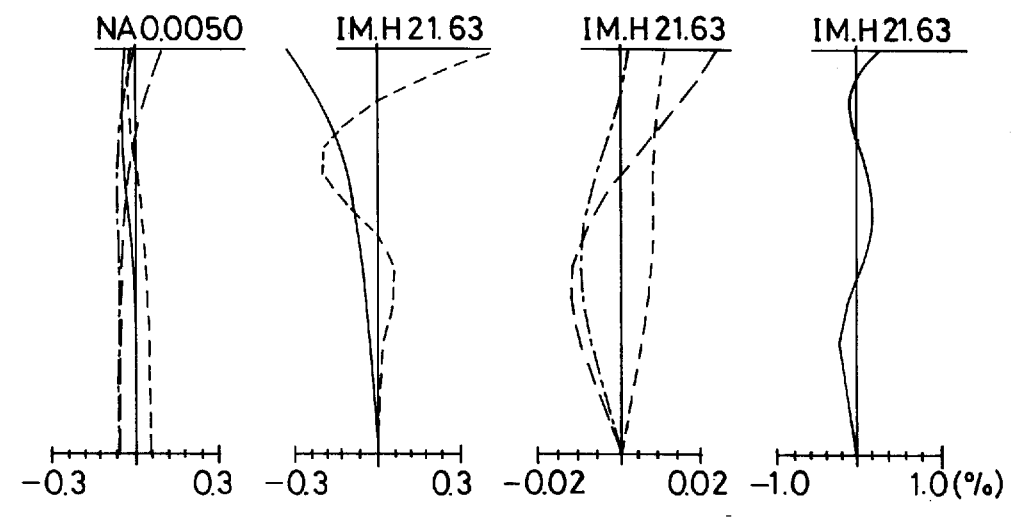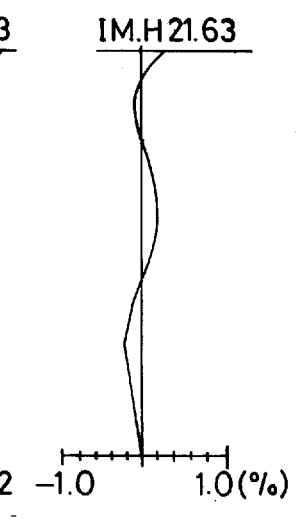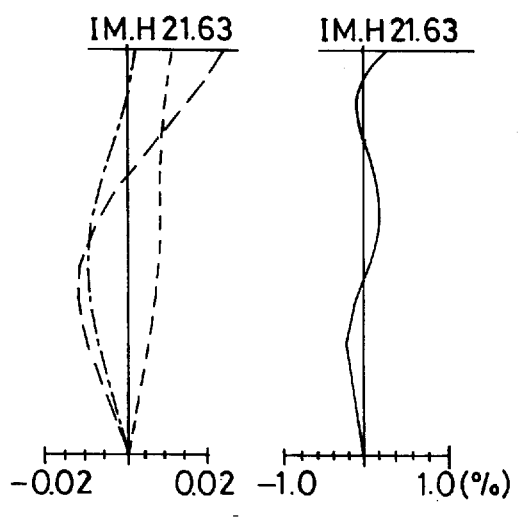

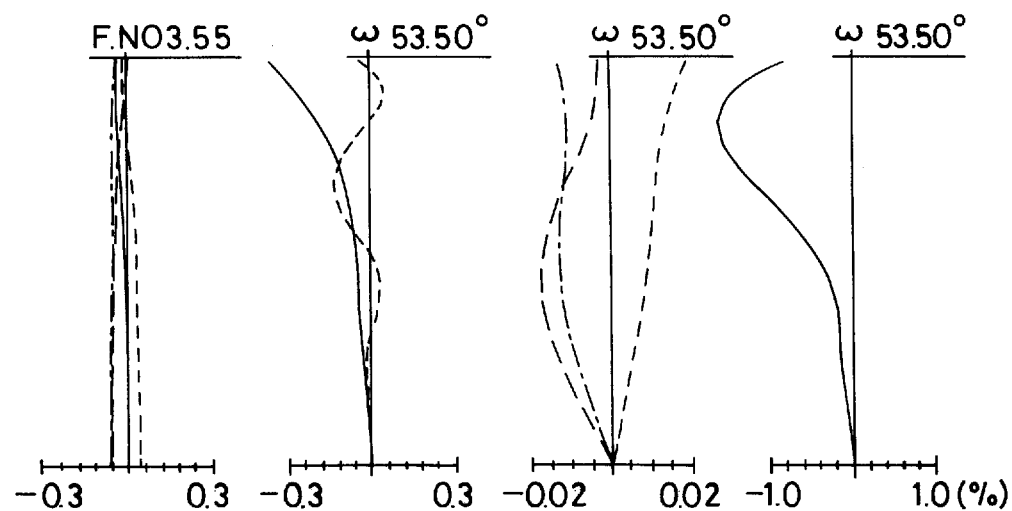
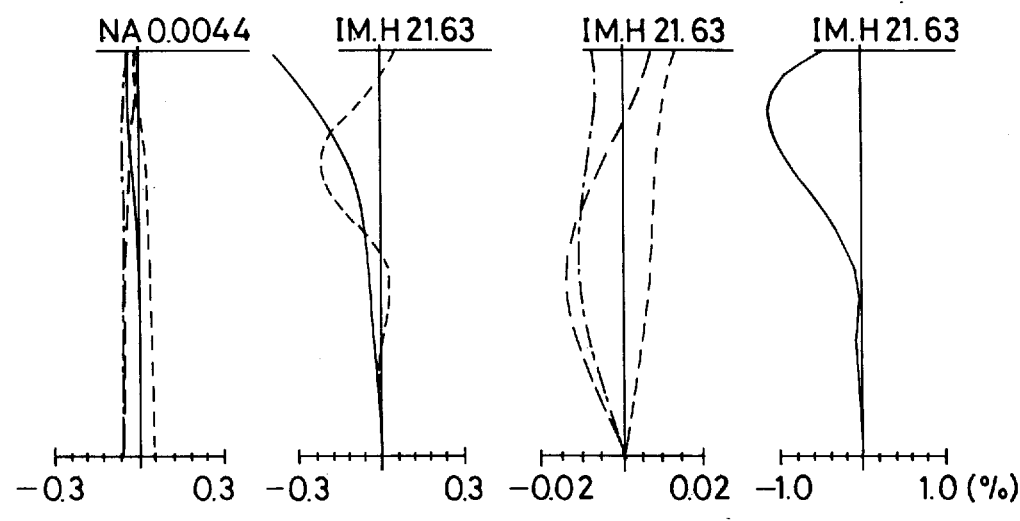

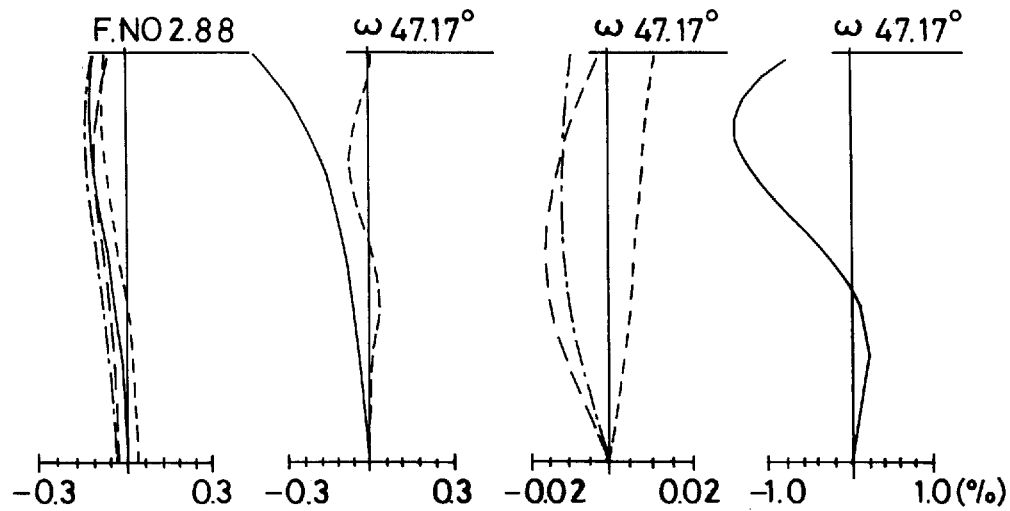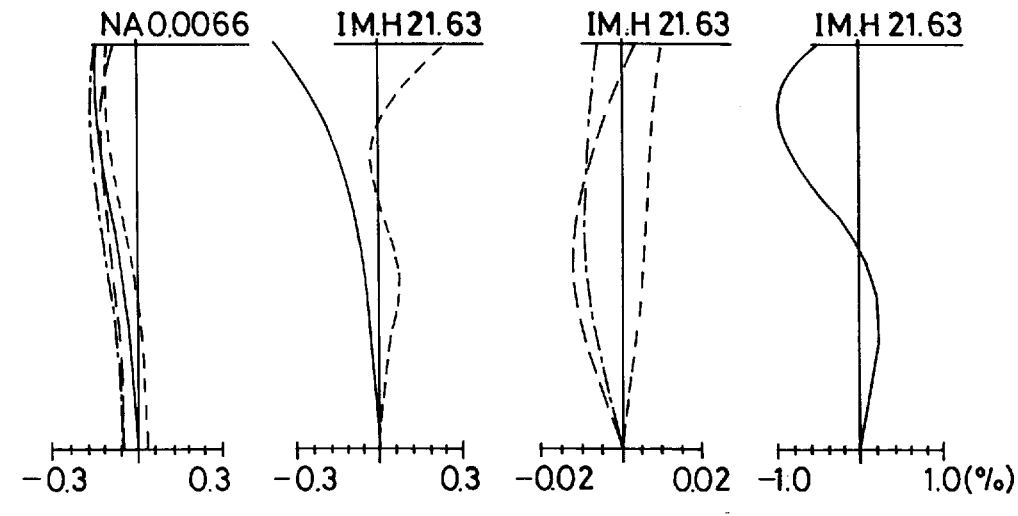

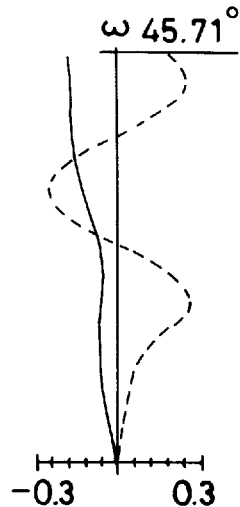
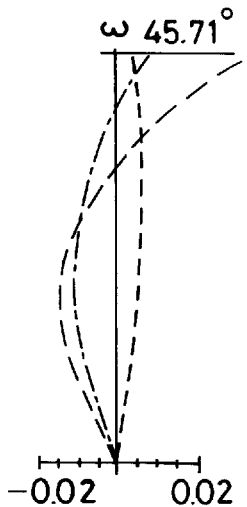
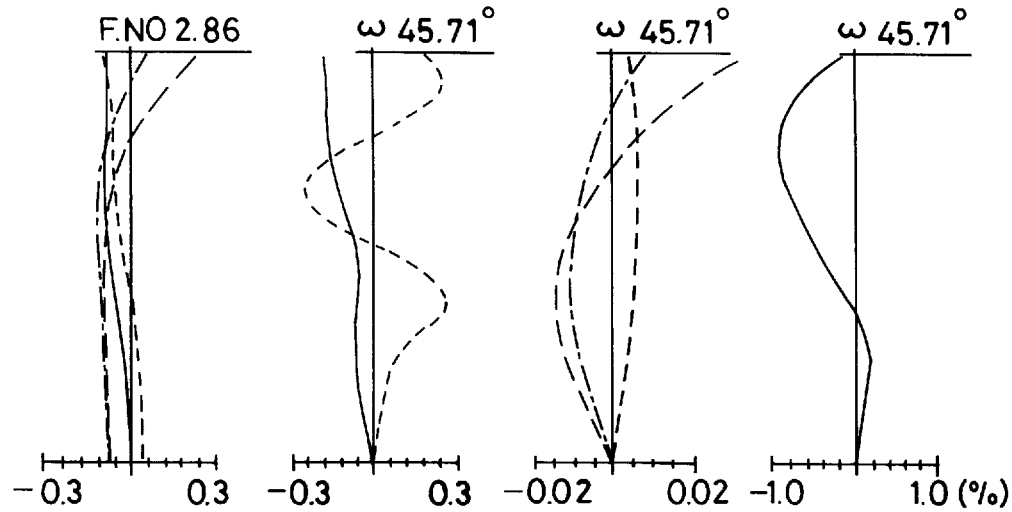
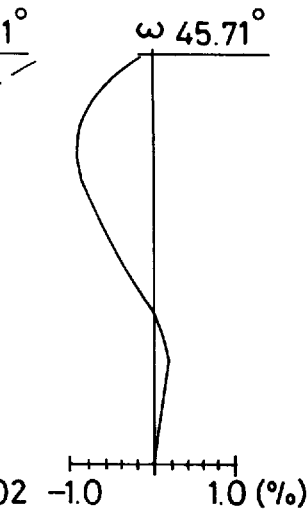
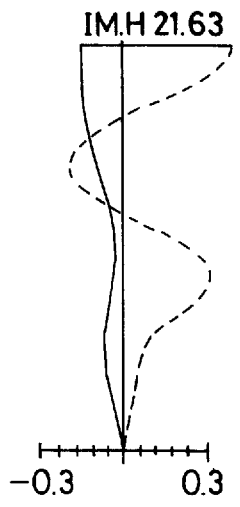
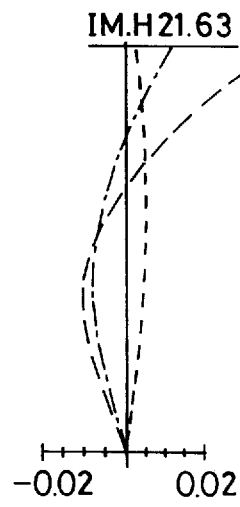
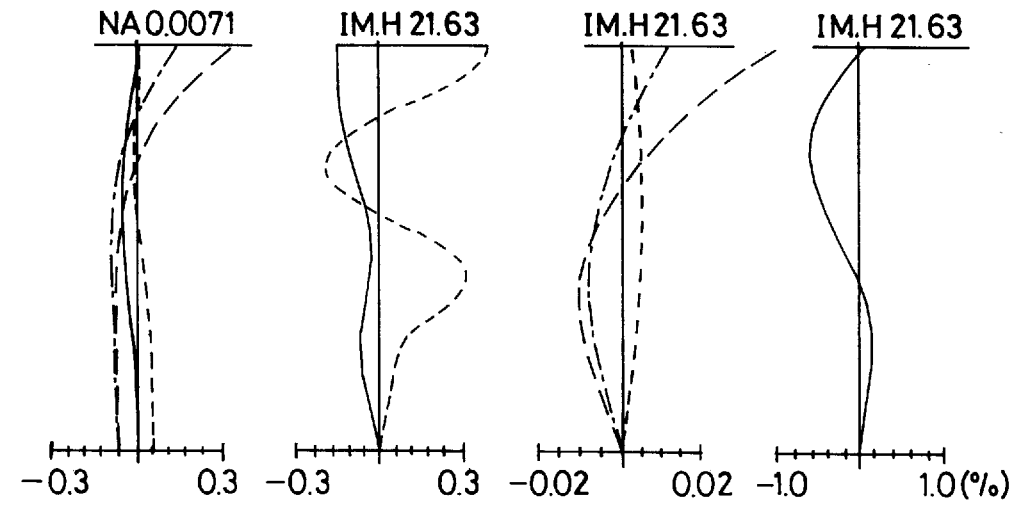
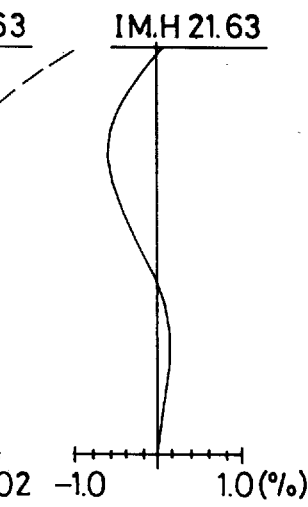

WIDE-ANGLE LENS SYSTEM

BACKGROUND OF THE INVENTION

The present invention relates generally to a wide-angle lens system, and more particularly to a symmetrical wide-angle lens system having a field angle coverage of up to about 107° and an aperture ratio of about 1:2.8 to 3.5.

As is well known in the art, ultrawide-angle lenses having a field angle of about 90° or more, which are designed for use on single-lens reflex cameras, are constructed in the form of an asymmetrical inverted telephoto type which allows for a back focus large enough to locate a mirror-movable space. For achieving wider-angle layouts, lens arrangements tend to become very sophisticated in view of correction of distortion by the front negative lens groups thereof.

Limitations on the back focuses of cameras with a built-in range finder, on the other hand, are not strict, and symmetrical wide-angle lenses favorable for aberration correction have been proposed in U.S. Pat. Nos. 2,721,499 and 2,781,695. A representative ultrawide-angle lens having a field angle of about 120° and an aperture ratio of 1:8 has been put forward in U.S. Pat. No. 3,661,447.

These prior art lens systems are applicable not only to photographic lenses but to aerial photogrammetry as well, and are simpler in construction than an inverted telephoto type of lens systems. However, a problem associated with them is that an increased field angle results in a decreased aperture ratio. In general, the entire systems are moved for focusing purposes, but remnants of aberrations are still present throughout them, ending up in malfunctions at finite distances.

SUMMARY OF THE INVENTION

Consequently, an object of the present invention is to provide an ultrawide-angle, yet large aperture ratio, lens system having a field angle coverage of up to about 107° and an aperture ratio as large as about 1:2.8 to 3.5, which is applicable to either a photographic lens or an optical system for electronic image equipment, and is much improved over conventional symmetrical lens systems, i.e., wide-angle lens systems with negative lens groups located on both sides of a converging component having an aperture stop in terms of vignetting factor, sagittal image surface performance, and lens layout. Another object of the present invention is to provide a focusing method with an improved performance at finite distances.

According to the present invention, the above-mentioned objects are achieved by the provision of a wide-angle lens system comprising, in order from an object side, a first lens group having a negative refracting power, a second lens group having a positive refracting power and a third lens group having a negative refracting power, wherein:

said first lens group comprises at least one negative meniscus lens convex on the object side, said second lens group comprises an aperture stop and at least one set of cemented lenses, said third lens group comprises at least one negative meniscus lens convex on an image side, an aspherical surface is used in any one of said lens groups, and the following conditions are satisfied:

$$1.0 < |f_1/f_2| < 12 \quad (1)$$

$$0.8 < |f_3/f_2| < 8 \quad (2)$$

$$0.2 < |D_1/f| < 3.0 \quad (3)$$

where $f_1$ : the focal length of the first lens group;
$f_2$ : the focal length of the second lens group;
$f_3$ : the focal length of the third lens group;
$f$ : the focal length of the entire system; and
$D_1$ : the spacing between the first and second lens group.

Another wide-angle lens according to the present invention comprises, in order from an object side, a first lens group having a negative refracting power, a second lens group having a positive refracting power and a third lens group having a negative refracting power, wherein:

said first lens group comprises at least one negative meniscus lens convex on the object side, said second lens group comprises an aperture stop and at least one set of cemented lenses, said third lens group comprises at least one negative meniscus lens convex on an image side, and when focusing is to be effected from an object at infinity on a short distance object, the entire system is moved toward the object side while the spacings between the respective lens groups or the spacing of a subordinate system in a given lens group are varied, thereby reducing or substantially eliminating aberration variations.

For focusing from an object at infinity on a short distance object, for instance, the entire system is moved toward the object side while the spacing of an air lens in the first lens group and the spacing between the second and third lens group may be varied.

A detailed account will now be given of why the above mentioned layouts are used in the present invention, and how they function.

A symmetrical wide-angle lens system to which the present invention is to be applied comprises negative meniscus lens groups located in front of and behind a converging component including an aperture stop in nearly concentric relation thereto. This optical system is a very well-balanced one if aberration correction is taken into consideration, and makes it easy to correct sagittal coma which becomes noticeably worse in the case of a wide-angle system and is considered difficult to correct in the case of an optical system composed of spherical surfaces alone. With this optical system, distortion expanded into a power series as a function of the angle of field, too, can be corrected with relative ease because of the symmetry thereof.

The inventors have made a study of whether or not a wider-angle layout having a larger aperture ratio can be achieved in simple construction, and have found an approach to realizing this. For this purpose it is required to make effective use of an aspherical surface or surfaces.

A grave problem with lens systems used over a wide range from objects at infinity to short distance objects, for instance, photographic lens systems, is that focusing by the movement of the entire system gives rise to a difference in the speed of movement between the center best image plane and the off-axis best image plane, resulting in malfunctions. Quick focusing cannot always be achieved due to the movement of heavy lenses and a change in the entire length. The lens layout is mainly governed by the number of lenses forming the first lens group and the construction of the second lens group, depending on the required field angle and aperture ratio.

According to the present invention, a symmetrical wide-angle lens system is achieved in simple construction and the refracting powers of the surfaces used are controlled by use of aspherical surfaces. It has now been found that the following layouts are effective for providing a solution to the above-mentioned problems associated with this type of lens system.

Thus, the present invention provides a wide-angle lens system comprising, in order from an object side, a first lens group having a negative refracting power, a second lens group having a positive refracting power and a third lens group having a negative refracting power, characterized in that:

said first lens group comprises at least one negative meniscus lens convex on the object side, said second lens group comprises an aperture stop and at least one set of cemented lenses, said third lens group comprises at least one negative meniscus lens convex on an image side, an aspherical surface is used in any one of said lens groups, and the following conditions are satisfied:

$$1.0 < |f_1/f_2| < 12 \quad (1)$$

$$0.8 < |f_3/f_2| < 8 \quad (2)$$

$$0.2 < |D_1/f| < 3.0 \quad (3)$$

where $f_1$ : the focal length of the first lens group;

$f_2$ : the focal length of the second lens group;

$f_3$ : the focal length of the third lens group;

$f$ : the focal length of the entire system; and $D_1$ : the spacing between the first and second lens group.

As mentioned above, the present invention provides an ultrawide-angle lens system which is of very simple construction and has a large aperture ratio. The reasons will be explained below.

It has so far been noted that it is particularly distortion and chromatic aberration of magnification which are hard to correct in the case of an ultrawide-angle lens system. These aberrations are well corrected according to an aspect of this invention by locating negative meniscus lenses symmetrically with respect to a cemented lens group forming the second lens group, even when there is an increase in the angle of field.

By limiting the construction of the second lens group to a cemented lens group it is also possible to reduce the entire length of the lens system; in other words, it is possible to prevent any increase in the size of the lens system when the vignetting factor thereof is improved.

An increase in the sagittal coma flare incidental to an increased aperture ratio, too, is avoided by using an aspherical surface in the first lens group. From the center to peripheral portions, the aspherical surface is preferably shaped such that the refracting power of the surface diminishes for a convex surface on the one hand and the divergence of the surface increases for a concave surface on the other hand.

In the present invention it is important that spherical aberration be corrected by the converging component of the second lens group.

The layout of the third lens group is very important for the flatness of off-axis field, and it is possible to enhance this ability by use of an aspherical surface.

In what follows, an account will be given of what is implied by the conditions concerning the paraxial refracting power profile.

The above-mentioned condition (1) defines the ratio of refracting power between the first and second lens groups. Falling below the lower limit of 1.0 in condition (1) is desired for compactness because the relative refracting power of the first lens group increases, but is not preferable because there is an increase in the amount of aberrations produced, especially distortion and sagittal coma. Exceeding the upper limit of 12 is desired for correction of off-axis aberrations, but is not preferable because it results in an increase in the size of the first lens group.

Condition (2) defines the ratio of refracting power between the third and second lens groups. In other words, whenever the refracting power of the second converging lens group is determined, the refracting power of the third lens group is determined. Falling below the lower limit of 0.8 in condition (2) is favorable for making the rear group compact because the relative refracting power of the third lens group increases, but is not preferable because curvature of field and chromatic aberration of magnification become worse. Exceeding the upper limit of 8 is advantageous for correction of off-axis aberrations such as curvature of field, but does not produce any desired results because there is not only a decrease in the space allowed for the back focus but there is also an increase in the outer diameter of the third lens group, which may otherwise lead to an increase in the thickness of the lens barrel.

Condition (3) defines the axial distance between the first and second lens groups, and bears direct relation to reducing the entire length of the lens system. When the lower limit of 0.2 is not reached, the principal point separation is reduced, and a problem arises in connection with aberration correction because the refracting power of the first or second lens group must be increased. Exceeding the upper limit of 3.0 is tantamount to an increase in the distance between the first lens group and the entrance pupil, and the size of the lens system becomes large as a matter of course. Upon being made unreasonably compact, the lens system is likely to become asymmetric with respect to the aperture stop, and so an aspherical surface with a large aspherical quantity must unavoidably be used. Thus, there is an unacceptable departure from the purpose of the present invention.

The layout of the lens system according to the present invention will now be explained. This lens system has a field angle of 107° and an aperture ratio of 1:2.8. Lens systems of simpler construction will be explained with reference to Examples 1 and 6 to be given later. The lens system of the former is shown in section in FIG. 1 while a more detailed optical path diagram thereof is shown in FIG. 16. The lens system of the latter is shown in section in FIG. 3 while a more detailed optical path diagram thereof is shown in FIG. 17.

The lens system of Example 1 is shown in section in FIG. 1 while a more detailed optical path diagram thereof is shown in FIG. 16. Here, a reference spherical surface is shown by a dotted line in FIG. 16. A first lens in a first lens group G1 is a negative meniscus lens wherein aspherical shape used for the convex surface thereof is so noticeable that it is particularly effective for correcting of sagittal coma, and distortion. It is here noted that the surface refracting power of a peripheral portion of the lens becomes extremely strong. The rear, or concave, surface of this lens has a strong refracting power, so that it is effective for a bundle of marginal rays. The symmetry of the bundle of marginal rays with respect to the incident surface is ensured so that an improved correction of sagittal coma can be achieved. Correction of distortion can also be performed to yield a well-balanced state.

An aspherical surface used for the second lens group G2 that is proximate to the image side is also effective for correcting off-axis coma and astigmatism. This aspherical surface is shaped such that the surface refracting power of a peripheral portion thereof is decreased with an aspherical quantity decrease. An aspherical surface used for the third lens group G3 that faces the image side is effective for correcting of the final image surface, and distortion as well. This aspherical surface is shaped such that the surface refracting power diminishes with increasing distance from the optical axis. The same holds basically for Example 6.

The values of the aberration coefficients are set out in Table 1, on the basis of which the state of correction of aberrations in the lens system will explained.

TABLE 1

| k | $SA_3$ | $SA_5$ | $CM_3$ | $CM_5$ | SCM |
|---|---|---|---|---|---|
| 1 | −0.0107 | 0.00031 | 0.30298 | −0.01733 | −3.63196 |
| 2 | 0.03506 | 0.00083 | −0.60453 | 0.00117 | 4.81464 |
| 3 | −0.00359 | −0.00033 | −0.048 | −0.00018 | 0.09803 |
| 4 | 0.00025 | 0.00005 | 0.01411 | 0.00113 | −0.17469 |
| 5 | 0 | 0 | 0 | 0 | 0 |
| 6 | −0.10559 | −0.01645 | −0.6041 | −0.03656 | 0.45373 |
| 7 | 0.04081 | 0.01116 | 0.13272 | 0.02873 | −0.07907 |
| 8 | 0.01936 | −0.02226 | 0.58007 | −0.15985 | −0.127063 |
| 9 | 0.03878 | 0.00441 | 0.2241 | 0.02264 | −0.06274 |
| 10 | −0.01051 | −0.00044 | 0.02099 | 0.00651 | 0.18583 |
| $G_1$ | 0.02101 | 0.00086 | −0.33544 | −0.01522 | 1.10603 |
| $G_2$ | −0.04543 | −0.02755 | 0.10868 | −0.16768 | −0.89597 |
| $G_3$ | 0.02827 | 0.00398 | 0.24509 | 0.02916 | 0.12309 |
| Σ | 0.00385 | −0.02271 | 0.01833 | −0.16374 | 0.33315 |

| k | $AS_3$ | $DT_3$ | $PT_3$ |
|---|---|---|---|
| 1 | −0.103305 | 8.26372 | −0.13872 |
| 2 | 1.38632 | −12.17958 | 0.40535 |
| 3 | −0.07124 | −0.58539 | −0.06025 |
| 4 | 0.08827 | 1.46987 | −0.00996 |
| 5 | 0 | 0 | 0 |
| 6 | −0.38403 | −1.69093 | −0.50262 |
| 7 | 0.04796 | 0.12437 | 0.06676 |
| 8 | −0.2018 | 1.03678 | −0.0916 |
| 9 | 0.14388 | 1.59928 | 0.68643 |
| 10 | 0.08508 | 0.98037 | −0.40597 |
| $G_1$ | 0.37029 | −3.03138 | 0.19642 |
| $G_2$ | −0.53787 | −0.52979 | −0.52747 |
| $G_3$ | 0.22896 | 2.57965 | 0.28046 |
| Σ | 0.06138 | −0.98152 | −0.05059 |

Here, k represents the surface number; SA the spherical aberration coefficient; CM the coma coefficient; SCM the sagittal-related coma coefficient; AS the astigmatism coefficient; DT the distortion coefficient; and PT the curvature of field coefficient with suffixes standing for the third- and fifth-order aberration coefficients, respectively. $G_1$, $G_2$ and $G_3$ are the sum totals of the aberration coefficients concerning the first, second and third lens groups G1, G2 and G3, with the symbol Σ standing for the sum total of the coefficients throughout the entire system.

In regard to spherical aberration, the lower-order aberration coefficients or the third-order aberration coefficients are governed by an overcorrecting action resulting from a bundle of dispersive rays in the first and second lens groups G1 and G3 each having a negative refracting power, and by an undercorrecting action resulting from the converging action of the second lens group G2 having a positive refracting power. The action of the first lens group G1 on spherical aberration is more slender than those of the rest, and the strong refracting power of the second lens group G2 functions to make correction for overcorrected spherical aberration occurring at the first lens group G1. Besides, the dispersive action of the third lens group G3 allows the entire system to be placed in a well-balanced state.

The negative meniscus lens of the first lens group G1 plays a relatively large role in coma correction, and plays a much larger role in correction of sagittal coma. However, large coma is actually produced at the second lens group G2, and is compensated for by the third- and fifth-order aberration coefficients.

Astigmatism is largely affected by the negative meniscus lens of the first lens group G1 located on the image side, with large amounts of higher-order aberration coefficients produced. It is desired that astigmatism be corrected by using an aspherical surface for this surface. Referring to the action on correction of curvature of field, the third lens group G3 functions to erect the image surface that is displaced in the negative direction and bent toward the object side.

A noticeably large amount of distortion occurs at the negative meniscus lens of the first lens group G1 as is the case with astigmatism. Use of an aspherical surface is very effective for distortion correction. The third-order aberration coefficients indicate that negative distortion is corrected by the third lens group G3.

It is noted that remnants of curvature of field due to the first and second lens groups G1 and G2 are corrected by the third lens group G3.

It is particularly desired that the first lens group G1 be composed of a negative meniscus lens and a positive lens, because the correction of chromatic aberration occurs within the first lens group G1, and the fine correction of various aberrations occurs within the first lens group G1 as well.

From the foregoing, it is found that, for the purpose of spherical aberration correction, it is desired to use an aspherical surface for the lens surface of the second lens group that has a converging action. This is also required for making the aperture ratio of the lens system large. Which aspherical surface takes part in correction of coma that is off-axis aberration is not always clearly identified, but some effect is more or less expectable whenever an aspherical surface is used in any one of the lens groups. However, the most favorable effect is achievable when an aspherical surface is used for the front surface of the first lens group or for the surface of the second group that faces the image side, or in the third lens group. From the values of SCM shown in Table 1, it is found that an aspherical surface used in the first lens group is greatly effective for correcting sagittal coma. For the purpose of correcting astigmatism, and distortion it is very effective to use an aspherical surface for the meniscus lens of the first lens group in particular.

Referring here to illustrative lens layouts, an ultrawide-angle lens system can be achieved by using a simple lens layout as follows. That is, the first lens group is composed of one negative meniscus lens convex on an object side and a positive lens between which an air lens is interposed, the second lens group is composed of one set of cemented lens consisting of a negative lenses and a positive lens, and the third lens group is composed of one negative meniscus lens convex an image side.

The construction of the first lens group is characterized by allowing the lens system to have such effects as mentioned above, and enables the range of choice of vitreous material to be enlarged. In view of coma correction, the first negative lens within the first lens group is basically a meniscus lens. In view of correction of the image surface, especially a Petzval's sum to say nothing of correction of aberrations, especially chromatic aberration, it is a minimal condition that the second lens group be composed of a cemented lens. In particular, this is essentially required for the present invention which has for its object to achieve a large aperture ratio. However, a doublet with an air space between may be used, but depending on the magnitude of the desired aperture ratio. When the second lens group is composed of a single lens, it is indeed impossible to meet the demand of a large aperture ratio. However, the second lens group may be made up of a single lens depending on the magnitude of the desired aperture ratio.

The third lens group exerts an action on image surface correction, and so is composed of a single negative meniscus lens. To ensure a sufficient distance between it and the image surface, the third lens group is actually composed of a double concave lens. In view of correction of coma, etc., however, it is greatly effective for correction of peripheral aberrations to use an aspherical surface therefor. As a matter of course, the third lens group may be composed of a plurality of lenses.

More simply, the wide-angle lens system according to the present invention is of the following lens layout. More specifically, the first lens group comprises one negative meniscus lens convex on an object side, the second lens group comprises one set of cemented lenses consisting of a negative lens and a positive lens, and the third lens group comprises one negative meniscus lens convex on an image side. This lens layout is different from the above-mentioned layout in that the first lens group is composed of a negative meniscus lens alone. Moreover, if an additional constituting element other than the cemented lens is provided in the second lens group, some effect for aberration correction is expected. In other words, the first lens group comprises at least one negative meniscus lens convex on the object side, the second lens group comprises two negative lenses and one positive lens, and the third lens group comprises one negative meniscus lens convex on the image side. For instance, the second lens group may be composed of a cemented triplet consisting of a negative lens, a positive lens and a negative lens or one set of cemented lens and one negative lens with an air space between, so that the Petzval's sum and spherical aberration can be effectively corrected.

Reference will now be made to a focusing method according to the present invention and how to reduce aberration variations during focusing.

To this end, the present invention provides a wide-angle lens system comprising, in order from an object side, a first lens group having a negative refracting power, a second lens group having a positive refracting power and a third lens group having a negative refracting power in which said first lens group comprises at least one negative meniscus lens convex on the object side, said second lens group comprises an aperture stop and one set of cemented lens, and said third lens group comprises at least one negative meniscus lens convex on an image side, wherein:

when focusing is to be effected from an object at infinity on a short distance object, the entire system is moved toward the object side while the spacings between the respective lens groups or the spacing of a subordinate system in a given lens group are varied, thereby reducing or substantially eliminating aberration variations.

To be more specific, when focusing is to be effected from an object at infinity on a short distance object, the entire system is moved toward the object side while the spacing of an air lens in the first lens group and the spacing between the second and third lens groups may be varied. Alternatively, the entire system is moved toward the object side while the spacings between the first and second lens groups and the second and third lens groups may be varied. Still alternatively, the entire system is moved toward the object side while only the spacing between the first and second lens groups may be varied.

This will now be explained with reference to an illustrative example. Set out in Table 1 are the quantities of aberration changes upon the axial spacing changed by +0.1 mm in Example 1.

TABLE 2

| k | Bf | SA | DS | DM |
|---|---|---|---|---|
| 1 | −0.0039 | −0.0002 | 0.0069 | 0.0706 |
| 2 | −0.0217 | −0.0016 | 0.0136 | 0.0407 |
| 3 | −0.0071 | −0.0007 | 0.0113 | 0.0381 |
| 4 | −0.008 | −0.001 | 0.0282 | 0.092 |
| 5 (stop) | −0.008 | −0.001 | 0.0276 | 0.092 |
| 6 | −0.1363 | −0.0264 | 0.0132 | 0.0932 |
| 7 | −0.0636 | −0.0041 | 0.023 | 0.1185 |
| 8 | −0.1669 | −0.0102 | 0.0003 | 0.0474 |
| 9 | −0.0319 | 0.0012 | 0.0083 | 0.0381 |

Here k represents the spacing number, Bf the back focus, and SA zonal spherical aberration, and DS and DM sagittal and meridional astigmatisms at an image height ratio of 0.7, respectively. Spacing No. 2 refers to the spacing between the negative meniscus lens and positive lens in the first lens group G1. Spacing No. 8 refers to the spacing between the second and third lens groups G2 and G3 (see FIG. 16). These two spacings are of the same sign, and enable aberration variations to be reduced or substantially eliminated during focusing, if there is provided a mechanism for varying them in different directions during focusing. The quantity of movement may preferably be varied depending on the quantity of correction.

Then, Example 6 is explained. Spacings 2 and 5 are variable spacings between the respective lens groups during focusing (see FIG. 17). The quantities of changes in spherical aberration, and astigmatism in the meridional direction are of opposite signs with respect to the same quantity of change; so these spacings give rise to aberration variations due to focusing when the entire system is extended out. These aberration variations are corrected by varying the spacings between the respective lens groups by a different quantity or in a different direction. Set out in Table 3 are the quantities of changes in various parameters with respect to a spacing error of 0.1 mm.

TABLE 3

| k | Bf | SA | DS | DM |
|---|---|---|---|---|
| 1 | −0.0017 | −0.0001 | 0.0016 | 0.0611 |
| 2 | −0.0243 | −0.0021 | 0.0183 | 0.0625 |
| 3 (stop) | −0.0243 | −0.0021 | 0.0179 | 0.0559 |
| 4 | −0.1419 | −0.0438 | 0.0156 | 0.0938 |
| 5 | −0.0551 | −0.0129 | 0.0308 | 0.1286 |
| 6 | −0.1363 | −0.0042 | −0.0017 | 0.0207 |
| 7 | −0.0376 | −0.0011 | 0.0014 | 0.0073 |

Focusing may be achieved by an inner focusing method wherein the second lens group alone is moved.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 6a–6h is aberration diagrams of Example 1 upon focusing on an object point at infinity and −0.5 m;

FIG. 7a–7h is aberration diagrams of Example 2 similar to those of FIG. 6a–6h;

FIG. 8a–8h is aberration diagrams of Example 3 similar to those of FIG. 6a–6h;

FIG. 9a–9h is aberration diagrams of Example 4 similar to those of FIG. 6a–6h;

FIG. 11a–11h is aberration diagrams of Example 6 similar to those of FIG. 6a–6h;

FIG. 12a–12h is aberration diagrams of Example 7 similar to those of FIG. 6a–6h;

FIG. 13a–13h is aberration diagrams of Example 8 similar to those of FIG. 6a–6h;

FIG. 14a–14h is aberration diagrams of Example 9 similar to those of FIG. 6a–6h;

DESCRIPTION OF THE PREFERRED EMBODIMENTS

Figure 1A:
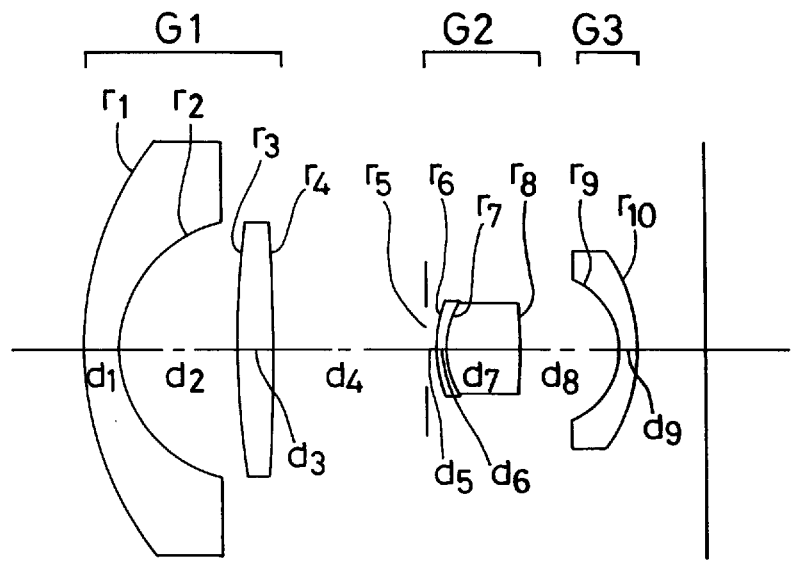
FIG. 1a–1b shows in section Example 1a–1b of the wide-angle lens system according to the present invention.

The wide-angle lens system according to the present invention will now be explained more illustratively with reference to Examples 1 through 10.

Ultrawide-angle lens systems referred to herein meet such specifications as represented by an aperture ratio of about 1:2.8 or about 1:3.5, and have sufficient ability to form images, as can be seen from the aberration diagrams to be explained later.

Throughout Examples 1 to 5, a first lens group G1 consists of two lenses, i.e., a negative meniscus lens and a positive lens, a second lens group G2 consists of one set of cemented lens, and a third lens group G3 consists of one negative meniscus lens; that is, the lens system is composed of five lens components in all.

Throughout Examples 6 to 9, a first lens group G1 consists of a negative meniscus lens, a second lens group G2 consists of one set of cemented lenses, and a third lens group G3 consists of a negative meniscus lens. That is, the lens system is composed of four lens components in all. Example 10 is basically the same as the above-mentioned four-component system with the exception that it is composed of five components because a second lens group G2 consists of a cemented triplet.

Examples 1 through 10 will now be explained more illustratively.

Example 1 is directed to a lens system having a focal length of 16.08 mm, an aperture ratio of 1:2.87 and a field angle of 106.74. The first lens group G1 is composed of a negative meniscus lens convex on an object side and a double convex lens, the second lens group G2 is composed of an aperture stop and a cemented doublet consisting of a negative meniscus lens convex on the object side and a double convex lens, and the third lens group is composed of one negative meniscus lens convex on an image side. Aspherical surfaces are used for both sides of the negative meniscus lens of the first lens group G1, and two additional aspherical surfaces are used, one for the surface of the triplet of the second lens group G2 that faces the image side and one for the surface of the negative meniscus lens of the third lens group G3 that faces the image side. The negative meniscus lens of the first lens group G1 cooperates with the adjoining positive lens to make correction for chromatic aberration, and so is not necessarily made up of a vitreous material that has a low index of refraction and is of low dispersion.

This ultrawide-angle yet large-aperture lens system has difficulty correcting of distortion, curvature of field, and sagittal coma. To eliminate this, the aspherical surfaces are used in the first lens group G1 to alleviate the burden imposed on correction of distortion. Consequently, the aspherical quantity of the first aspherical surface reaches 1,765 $\mu$m in the vicinity of the effective aperture. Again, the aspherical quantity of the aspherical surface used for the rear surface reaches 1,899 $\mu$m in the vicinity of the effective aperture. These surfaces are shaped such that they can act on a bundle of marginal rays in a way unachievable by use of spherical surfaces. The aspherical surface used for the surface of the second lens group G2 proximate to the image side has a great action on correction of meridional coma, and astigmatism. The aspherical surface used for the convex surface of the negative meniscus lens of the third lens group G3 has some relation to correction of a peripheral image surface, and makes a contribution to an improvement in the peripheral performance of the ultrawide-angle lens system. This aspherical surface is shaped such that the surface refracting power becomes weak farther and farther off the optical axis.

Figure 1B:
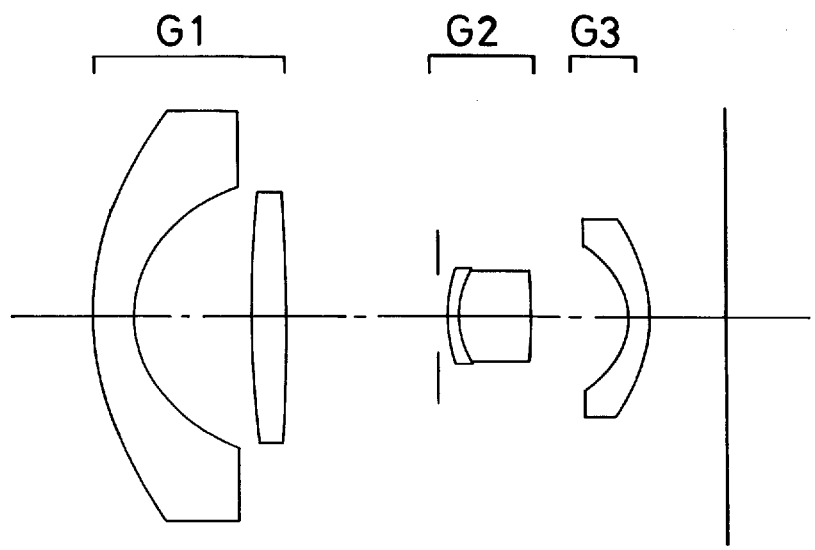

The lens system of Example 1 is shown in section in FIG. 1 wherein (a) represents focusing on an object point at infinity and (b) focusing on a finite object point of −0.5 m.

Focusing of the lens system is now explained. Focusing is basically carried out by the movement of the entire system. In the instant example, aberration variations are compensated for by decreasing the axial spacing between the lenses in the first lens group G1 by 0.316 mm and increasing the axial spacing between the second and third lens groups G2 and G3 by 0.05 mm.

FIGS. 6(a) to 6(d) are aberration diagrams of Example 1 upon focusing on an object point at infinity, and FIGS. 6(e) to 6(h) aberration diagrams of Example 1 upon focusing at −0.5 m. Spherical aberration, astigmatism, chromatic aberration of magnification, and distortion are represented at (a) and (e), (b) and (f), (c) and (g), and (d) and (h), respectively.

This lens system remains more or less affected by higher-order aberrations, but is very well corrected for aberrations whether on an object point at infinity or on a finite object point.

Example 2 is directed to an ultrawide-angle lens system having a focal length of 16.087 mm and an aperture ratio as large as 1:2.85. This example is identical with Example 1 in terms of layout and where aspherical surfaces are used, and so is not illustrated. Numerical values for the refracting power profiles of the respective lens groups are similar to those in Example 1, and the range of the vitreous material used bears resemblance to that in Example 1 as well. In reference to the amount of floating upon focusing at −0.5 m, the axial spacing between the lenses in the first lens group G1 provides a decrement of 0.389 mm while the spacing between the second and third lens groups 2 and 3 provides an increment of 0.045 mm. Aberration diagrams of the instant example similar to those of Example 6 are shown in FIG. 7 which indicates that the flatness of field is very high even at a field angle of about 107°. It is to be noted, however, that the aspherical surface used for the convex surface of the negative meniscus lens of the third lens group G3 has a point of inflection within the effective aperture.

Figure 2A:
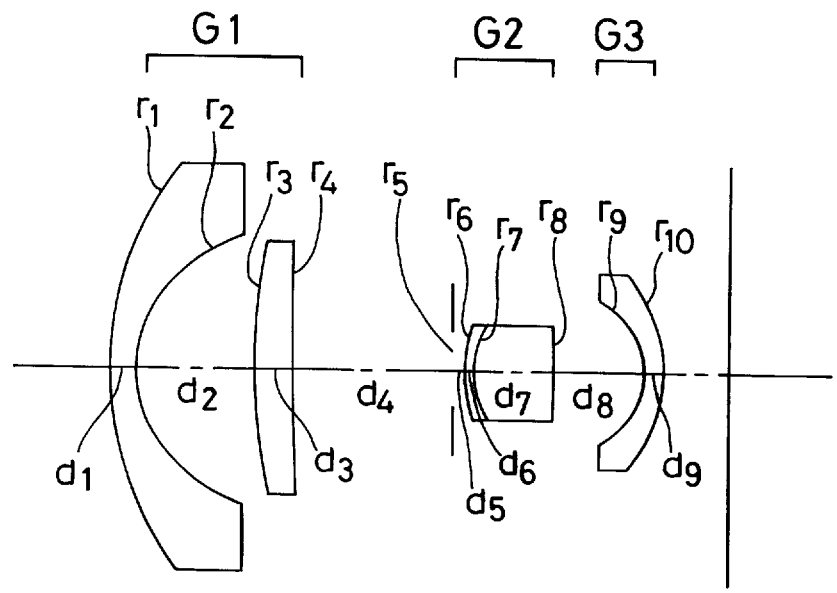
FIG. 2a–2b shows in section Example 3 of the wide-angle lens system according to the present invention.
Figure 2B:
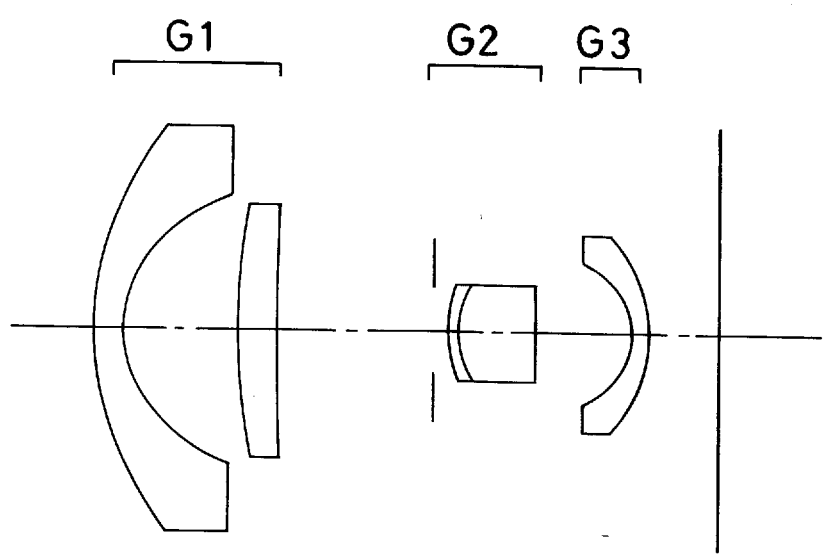

Example 3 is directed to an ultrawide-angle lens system having a focal length of 16.085 mm and an aperture ratio as large as 1:2.85. The first lens group G1 is composed of a negative meniscus lens convex on an object side and a positive meniscus lens convex on the object side, the second lens group is composed of an aperture stop and a cemented doublet consisting of a negative meniscus lens convex on the object side and a double convex lens, and the third lens group G3 is composed of one negative meniscus lens convex on an image side. Numerical values for the refracting power profiles of the respective lens groups bear resemblance to those in Example 1. Example 3 is again identical with Example 1 in terms of where aspherical surfaces are used. However, the instant example is different from Example 1 in that the second lens group G2 has a gentler radius of curvature. Referring then to the amount of floating upon focusing at −0.5 m, the axial spacing between the lenses in the first lens group G1 provides a decrement of 0.350 mm while the spacing between the second and third lens groups G2 and G3 provides an increment of 0.064 mm. A sectional lens layout of the instant example similar to that shown in FIG. 1 is illustrated in FIG. 2, and aberration diagrams thereof similar to those in FIG. 6 are presented in FIG. 8.

Example 4 is directed to a lens system having a focal length of 18.05 mm and an aperture ratio of 1:3.5. The instant example is identical with Example 2 in terms of lens layout, and so is not illustrated. The basic lens layout is similar to those of Examples 1–3, but this lens system becomes small by reason of a small aperture ratio. Three aspherical surfaces in all are used, one for the convex surface of the negative meniscus lens of the first lens group G1, one for the surface of the cemented lens of the second lens group G2 that faces an image side, and one for the surface of the third lens group G3 that faces the image side. The aspherical quantity is 280 $\mu$m for the first lens group G1 in the vicinity of the effective aperture, 334 $\mu$m for the second lens group G2 again in the vicinity of the effective aperture, and 390 $\mu$m for the third lens group G3. Aberration diagrams of the instant example similar to those of FIG. 6 are shown in FIG. 9. In reference to the amount of floating upon focusing at −0.5 m, the axial spacing between the lenses in the first lens group G1 provides an increment of 0.073 mm while the spacing between the second and third lens groups G2 and G3 provides a decrement of 0.007 mm. Thus, the changes in the spacings between the lenses and the groups during focusing are quite contrary to those in Examples 1–3. It is also found that aberration variations due to focusing are very limited.

Figures 10A, 10B, 10C, 10D:
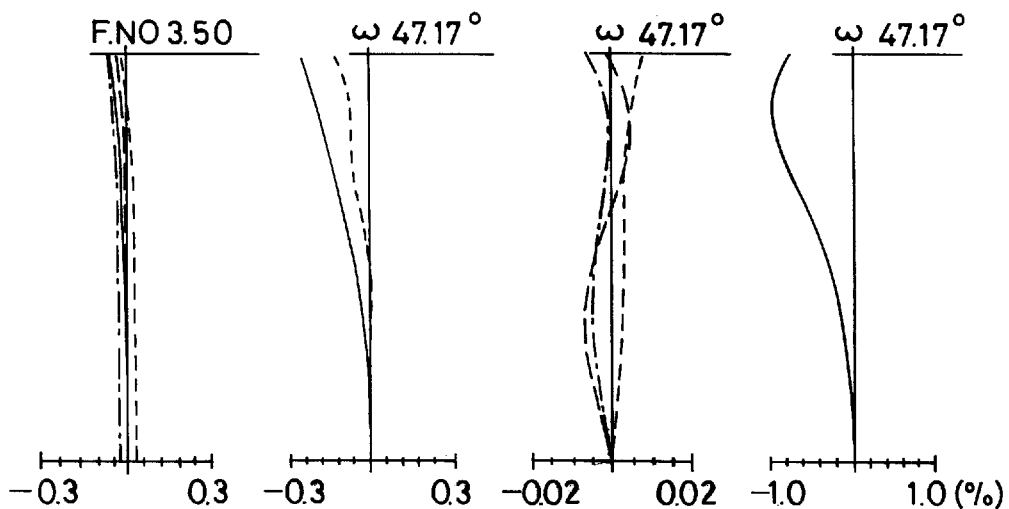
FIG. 10a–10h is aberration diagrams of Example 5 similar to those of FIG. 6a–6h.
Figures 10E, 10F, 10G, 10H:
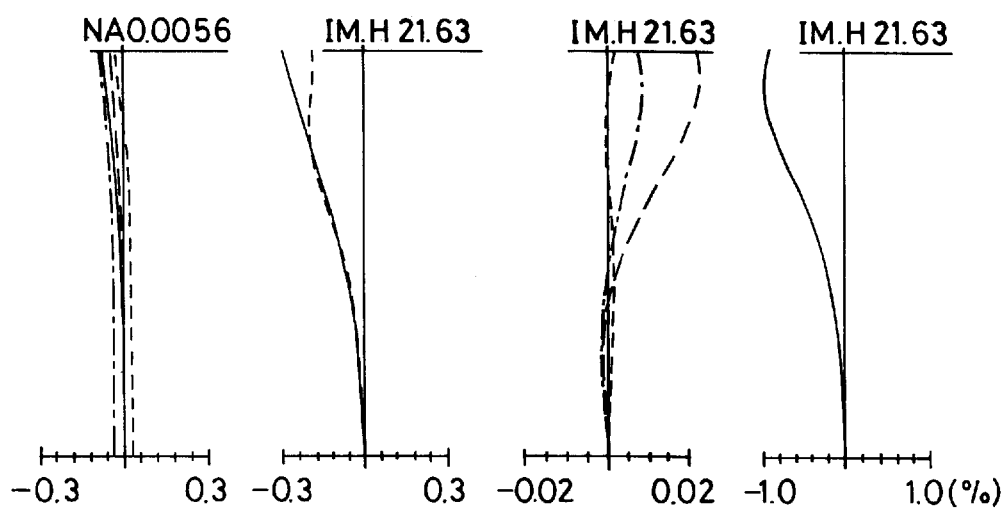

Example 5 is directed to a lens system having a focal length of 20.05 mm and an aperture ratio of 1:3.5. The instant example is identical with Example 1 in terms of lens layout, and so is not illustrated. Aberration diagrams of the instant example similar to those of FIG. 6 are shown in FIG. 10. Aspherical surfaces are used at the same places as in Example 4. The aspherical quantities of the aspherical surfaces used for the negative meniscus lenses in the first and third lens groups G1 and G3 are 403 $\mu$m and 153 $\mu$m, respectively, in the vicinity of the effective aperture. The aspherical quantity of the aspherical surface used for the second lens group G2 that faces the image side is again 42.5 $\mu$m in the vicinity of the effective aperture. In referring to the amount of floating upon focusing, the spacing between the lenses in the first lens group G1 provides an increment of 0.016 mm.

Figure 3A:
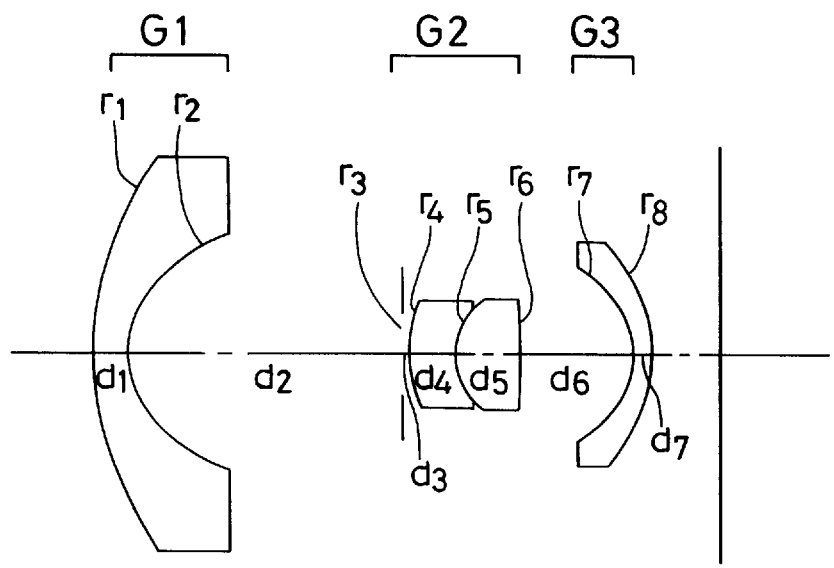
FIG. 3a–3b shows in section Example 6 of the wide-angle lens system according to the present invention.
Figure 3B:
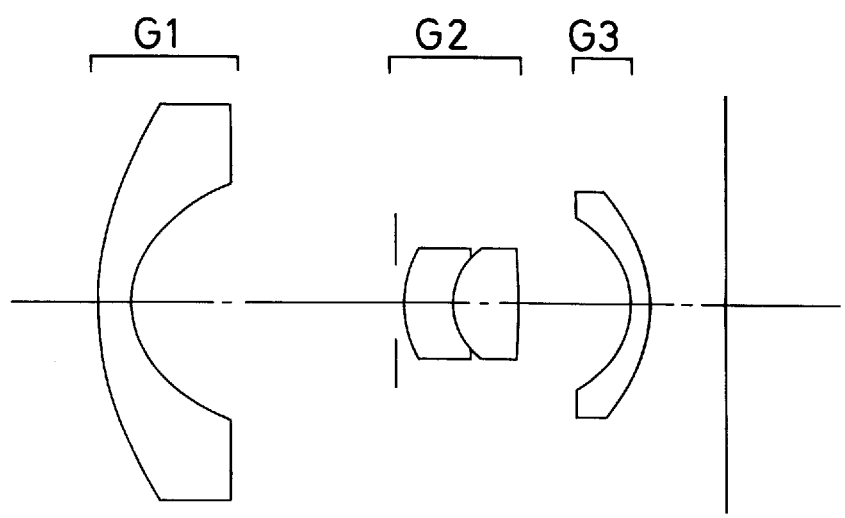

Example 6 is directed to a lens system having a focal length of 16.085 mm and an aperture ratio of 1:2.85. The instant lens system is of very simple construction, as shown in section in FIG. 3. To be specific, the first lens group G1 is composed of one negative meniscus lens convex on an object side, the second lens group G2 is composed of an aperture stop and a cemented doublet consisting of a negative meniscus lens convex on the object side and a double convex lens, and the third lens group G3 is composed of one negative meniscus lens convex on an image side. Aspherical surfaces are used for both surfaces of the negative meniscus lens of the first lens group G1, and two additional aspherical surfaces are used, one for the surface of the doublet in the second lens group G2 that is proximate to the image side, and one for the surface of the negative meniscus lens of the third lens group G3 that faces the image side. The first aspherical surface is used for the convex surface of the negative meniscus lens, and is shaped such that the surface refracting power becomes with increasing distance from the optical axis. This surface has an aspherical quantity of 2,250 $\mu$m in the vicinity of the effective aperture. The second aspherical surface used for the rear surface is a concave surface shaped such that the dispersive refracting power becomes strong with increasing distance from the optical axis. An, aspherical quantity of 1,425 $\mu$m is obtained in the vicinity of the effective aperture. The aspherical surface applied for the convex surface in the second lens group G2 is used for the purpose of making correction for meridional coma and astigmatism, and is shaped such that the aspherical quantity becomes larger with increasing distance from the optical axis with a decrease in the surface refracting power. The aspherical surface used for the convex surface of the negative meniscus lens of the third lens group G3 is designed such that the surface refracting power becomes weaker with increasing distance from the optical axis and so plays a role in erection of a peripheral surface image. This aspherical surface has an aspherical quantity of 1,289 $\mu$m in the vicinity of the effective aperture. Aberrations diagrams of the instant example similar to those of FIG. 6 are shown in FIG. 11.

In reference to the amount of floating upon focused at −0.5 m, the spacing between the first and second lens groups G1 and G2 provides a decrement of 0.520 mm while the spacing between the second and third lens groups G2 and G3 provides an increment of 0.115 mm, in sharp contrast to the changes in the spacings between the respective lens groups in Examples 1 to 3. When the first and third lens groups G1 and G3 are each composed of a single negative lens, it is required to use a vitreous material of low dispersion. When lens groups are determined by a lens group layout designed while floating is taken into consideration, this provides one of conditions for correcting chromatic aberrations within the groups, so that aberration variations can be reduced or substantially eliminated. In this lens system, some aberration variations remain uncorrected during focusing due to some remnants of higher-order aberrations. Even in the state of correction, the ultrawide-angle yet large-aperture lens system according to the instant example is considered to be very well corrected for aberrations.

Example 7 is directed to a lens system having a focal length of 16 mm and an aperture ratio of 1:3.55. The instant example is identical with Example 6 in terms of layout and where aspherical surfaces are used, and so is not illustrated. Aberration diagrams of the instant example similar to those of FIG. 6 are shown in FIG. 12. In reference to the amount of floating upon focusing at −0.5 m, the spacing between the first and second lens groups G1 and G2 provides a decrement of 0.228 mm while the spacing between the second and third lens groups G2 and G3 provides an increment of 0.002 m.

Example 8 is directed to a lens system having a focal length of 20.05 mm and an aperture ratio of 1:2.88. The instant example is identical in terms of layout with Example 6, and so is not illustrated. Three aspherical surfaces are used, one for the first surface of the negative meniscus lens of the first lens group G1, one for the surface of the second lens group G2 that is proximate to an image side, and one for the surface of the third lens group G3 that faces the image side. Aberration diagrams of the instant example similar to those of FIG. 6 are shown in FIG. 13. Referring then to the amount of floating upon focusing at −0.5 m, the spacing between the first and second lens groups G1 and G2 provides an increment of 0.010 mm while the spacing between the second and third lens groups G2 and G3 provides an increment of 0.017 mm.

Figure 4A:
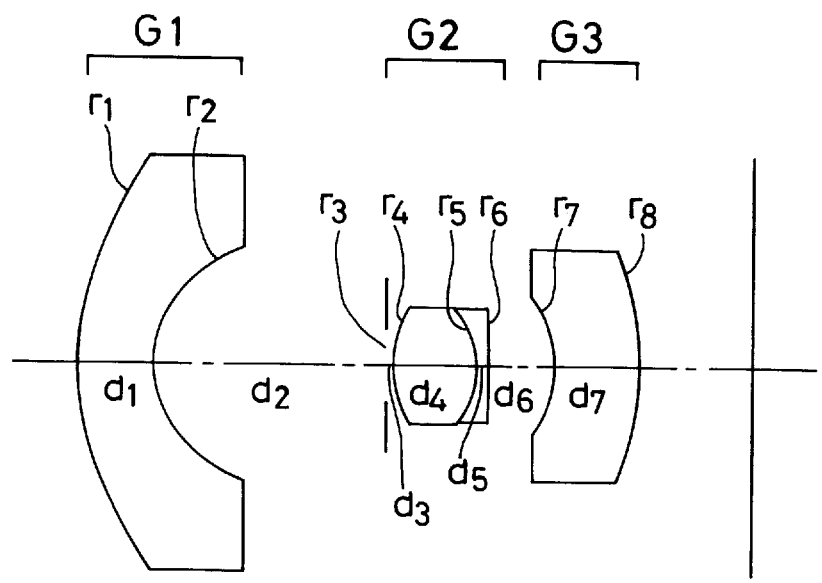
FIG. 4a–4b shows in section Example 9 of the wide-angle lens system according to the present invention.
Figure 4B:
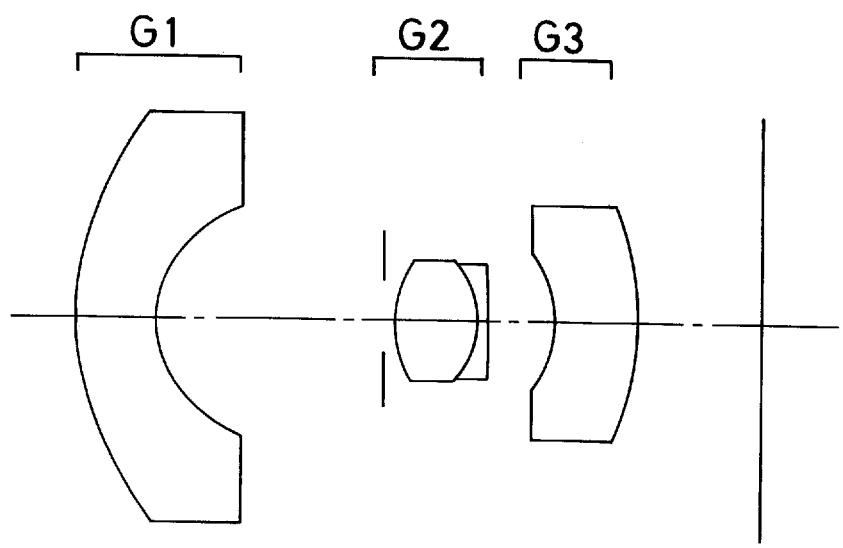

Example 9 is directed to a lens system having a focal length of 21.10 mm and an aperture ratio of 1:2.86. The first lens group G1 is composed of one negative meniscus lens convex on an object side, the second lens group G2 is composed of an aperture stop and a cemented doublet consisting of a double convex lens and a negative meniscus lens convex on an image side, and the third lens group G3 is composed of one negative meniscus lens convex on the image side. Aspherical surfaces are used for the first and second, or both, surfaces of the negative meniscus lens of the first lens group G1, and two additional aspherical surfaces are used, one for the surface of the second lens group G2 that is proximate to the image side and one for the concave surface of the negative meniscus lens of the third lens group G3. The instant example is shown in section in FIG. 4 similar to FIG. 1, with aberration diagrams thereof similar to those of FIG. 6 shown in FIG. 14. In reference then to the amount of floating upon focusing at −0.5 m, the spacing between the first and second lens groups G1 and G2 provides a decrement of 0.270 mm while the spacing between the second and third lens groups G2 and G3 provides a decrement of 0.051 mm.

Figure 5A:
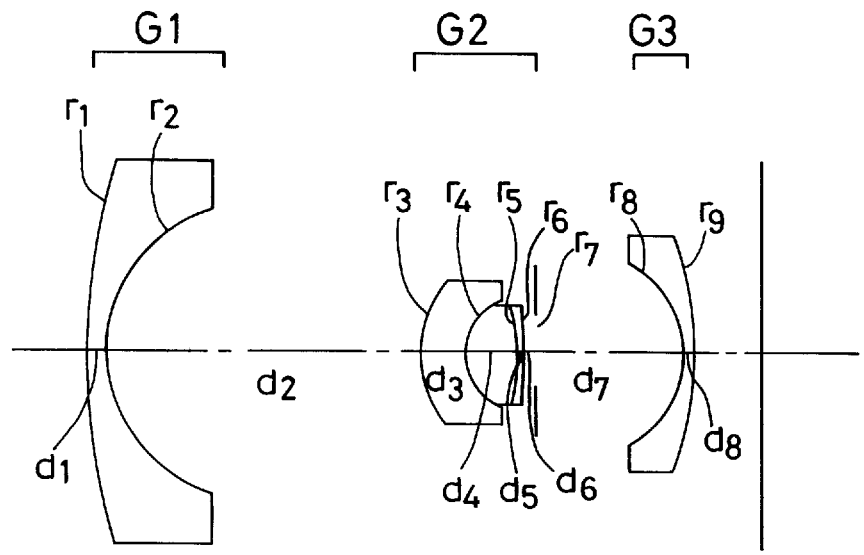
FIG. 5a–5b shows in section Example 10 of the wide-angle lens system according to the present invention.
Figure 5B:
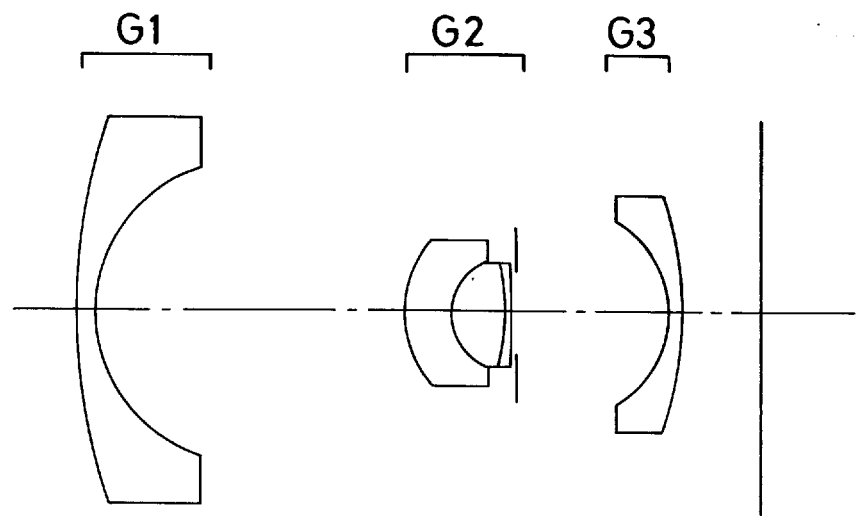
Figures 15A, 15B, 15C, 15D:
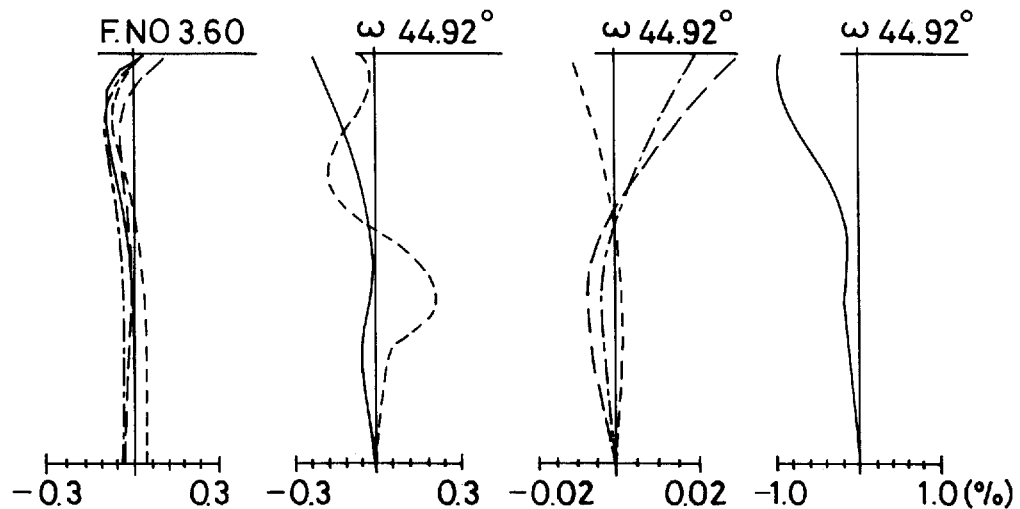
FIG. 15a–15h is aberration diagrams of Example 10 similar to those of FIG. 6a–6h.
Figures 15E, 15F, 15G, 15H:
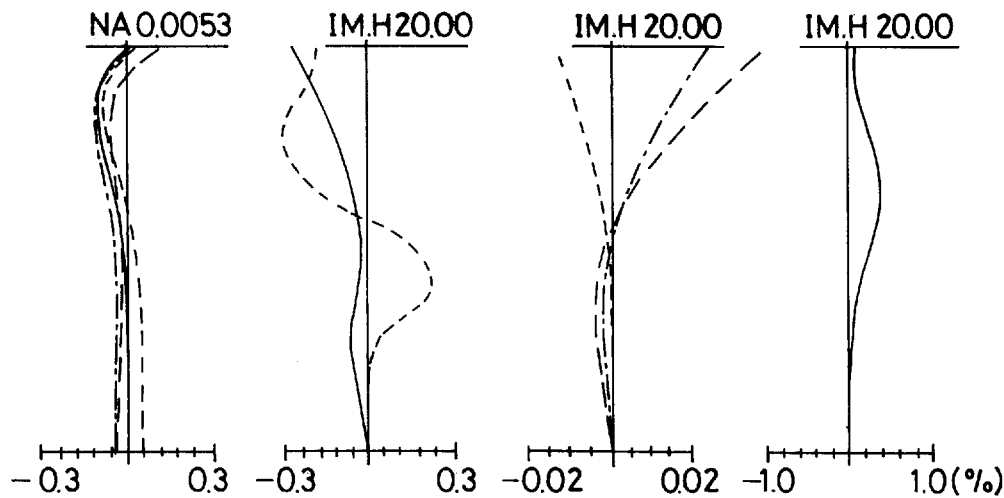
Figure 16:
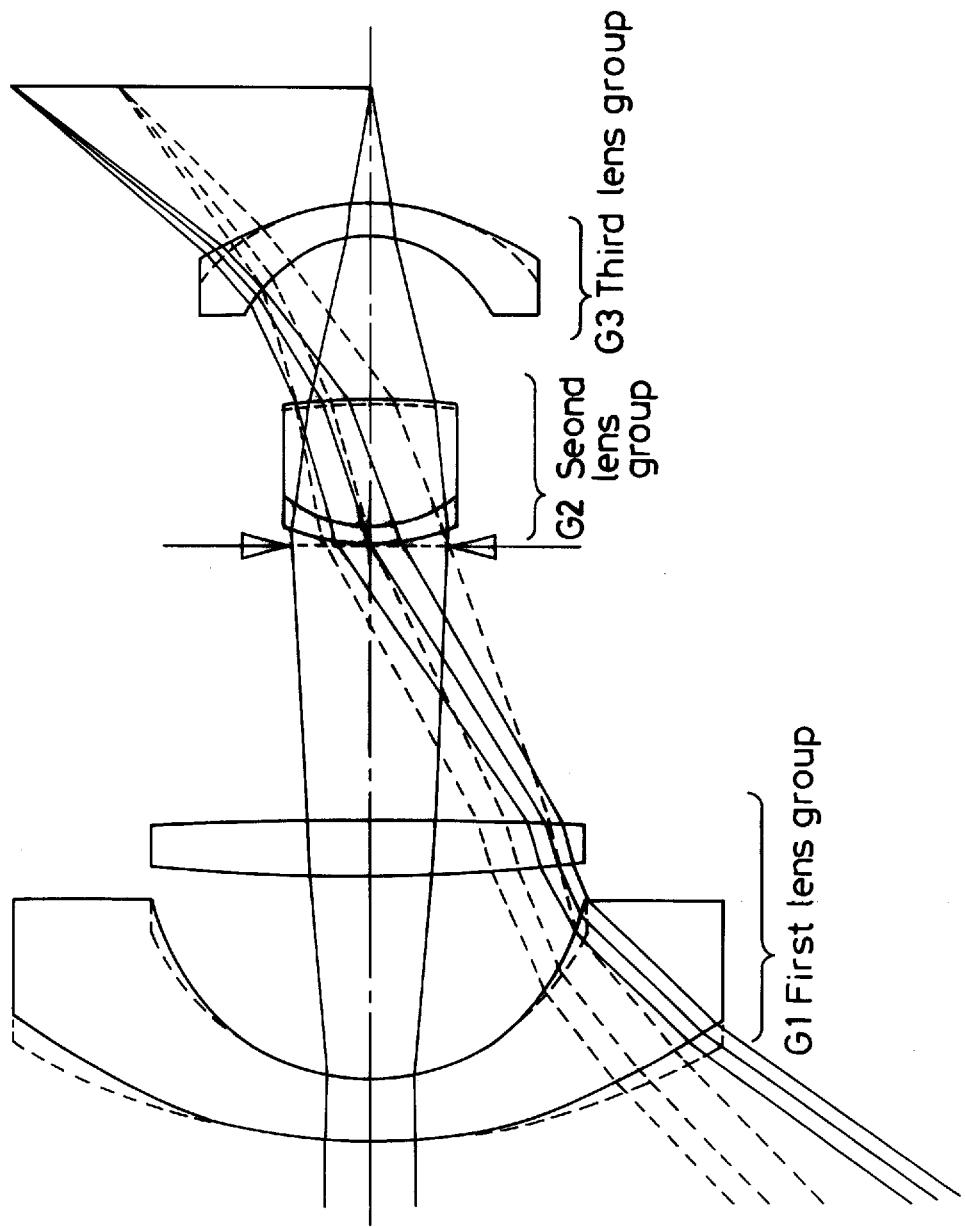
FIG. 16 is a more detailed optical path diagram of Example 1.
Figure 17:
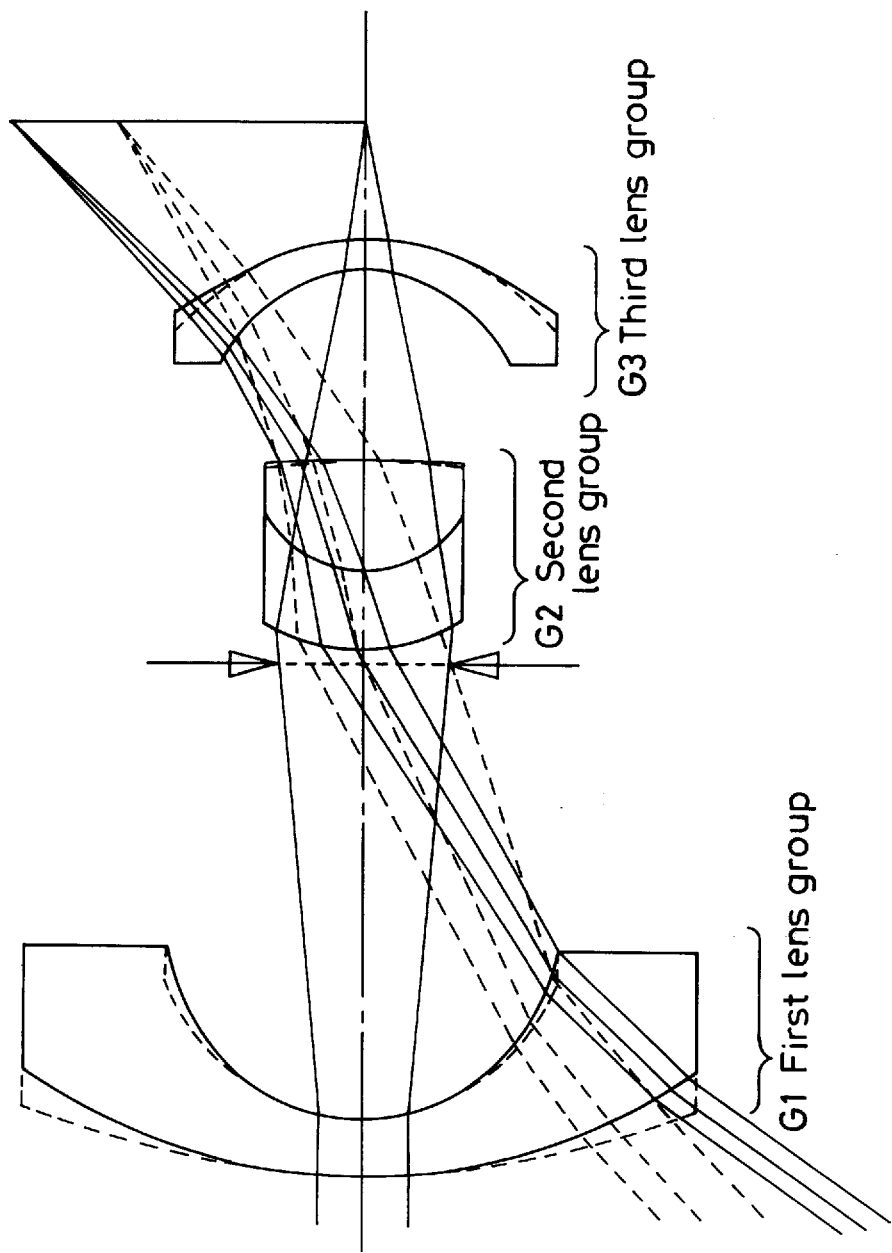
FIG. 17 is a more detailed optical path diagram of Example 6.

Example 10 is directed to a lens system having a focal length of 20.050 mm and an aperture ratio of 1:3.60. The first lens group G1 is composed of one negative meniscus lens convex on an object side, the second lens group G2 is composed of a cemented triplet consisting of a negative meniscus lens convex on the object side, a double convex lens and a negative meniscus lens convex on an image side and an aperture stop, and the third lens group G3 is composed of one negative meniscus lens convex on the image side. Three aspherical surfaces are used, one for the second, or concave, surface of the negative meniscus lens of the first lens group G1, one for the surface of the second lens group G2 that is proximate to the image side, and one for the concave surface of the negative meniscus lens of the third lens group G3. In this optical system, the second lens group G2 contains the cemented triplet. The instant example is shown in section in FIG. 5 similar to FIG. 1, with aberration diagrams thereof similar to those of FIG. 6 illustrated in FIG. 15. In reference to the amount of floating upon focusing at −0.5 m, the spacing between the first and second lens groups G1 and G2 provides a decrement of 0.064 mm while the spacing between the second and third lens groups G2 and G3 provides an increment of 0.017 mm.

Enumerated below are numerical data concerning each example. Symbols used hereinafter but not hereinbefore indicate:

f: the focal length of the entire system;

$F_{NO}$: the F-number;

ω: the half angle of field;

$r_1, r_2, \ldots$ : the radii of curvature of the respective lens surfaces;

$d_1, d_2, \ldots$ : the spacings between the respective lens surfaces;

$n_{d1}, n_{d2}, \ldots$ : the d-line indices of refraction of the respective lenses; and $\nu_{d1}, \nu_{d2}, \ldots$ : the Abbe's number of the respective lenses.

Now assume that x represents the positive direction of propagation of light and y the direction perpendicular to the optical axis. Then, aspherical shape is given by $$x = (y^2/r)/[1+\{1-P(y/r)^2\}^{1/2}] + A_4 y^4 + A_6 y^6 + A_8 y^8 + A_{10} y^{10}$$

where r: the paraxial radius of curvature;

P: the conical coefficient; and $A_4, A_6, A_8,$ and $A_{10}$ : the 4th, 6th, 8th, and 10th aspherical coefficients.

Example 1 f = 16.0848, $F_{NO}$ = 2.87, ω = 53.37°

$r_1$ = 42.0470 (Aspheric)   $d_1$ = 3.873    $n_{d1}$ = 1.69680   $\nu_{d1}$ = 55.53
$r_2$ = 14.3899 (Aspheric)   $d_2$ = 12.460
$r_3$ = 108.0948             $d_3$ = 3.538    $n_{d2}$ = 1.84666   $\nu_{d2}$ = 23.78
$r_4$ = −653.5641            $d_4$ = 16.870
$r_5$ = ∞ (Stop)             $d_5$ = 0.015
$r_6$ = 12.6050              $d_6$ = 1.000    $n_{d3}$ = 1.80518   $\nu_{d3}$ = 25.43
$r_7$ = 7.5285               $d_7$ = 7.877    $n_{d4}$ = 1.69680   $\nu_{d4}$ = 55.53
$r_8$ = −63.6768 (Aspheric)  $d_8$ = 10.366
$r_9$ = −7.9374              $d_9$ = 2.000    $n_{d5}$ = 1.62230   $\nu_{d5}$ = 53.20
$r_{10}$ = −13.4209 (Aspheric)

Floating Spaces

| | | |
|---|---|---|
| OBJ | ∞ | −500 |
| $d_2$ | 12.460 | 12.144 |
| $d_8$ | 10.366 | 10.416 |

Aspherical Coefficients
1st surface

P = 1.0000
$A_4$ = 0.30558 × 10$^{-4}$
$A_6$ = −0.69483 × 10$^{-7}$
$A_8$ = 0.47957 × 10$^{-10}$
$A_{10}$ = −0.19606 × 10$^{-14}$
2nd surface P = 1.0000
$A_4$ = 0.51365 × 10$^{-4}$
$A_6$ = 0.20701 × 10$^{-7}$
$A_8$ = 0.27987 × 10$^{-9}$
$A_{10}$ = −0.83838 × 10$^{-12}$
8th surface P = 1.0000
$A_4$ = 0.64243 × 10$^{-4}$
$A_6$ = −0.13275 × 10$^{-5}$
$A_8$ = 0.67514 × 10$^{-7}$
$A_{10}$ = −0.14021 × 10$^{-8}$
10th surface P = 1.0000
$A_4$ = 0.56429 × 10$^{-4}$
$A_6$ = 0.43681 × 10$^{-6}$
$A_8$ = −0.12163 × 10$^{-8}$
$A_{10}$ = 0.20200 × 10$^{-10}$

Example 2

$f = 16.087, F_{NO} = 2.85, \omega = 53.37°$

| | | | |
|---|---|---|---|
| $r_1 = 42.1323$ (Aspheric) | $d_1 = 3.311$ | $n_{d1} = 1.67000$ | $\nu_{d1} = 57.33$ |
| $r_2 = 14.4682$ (Aspheric) | $d_2 = 13.233$ | | |
| $r_3 = 178.1089$ | $d_3 = 3.082$ | $n_{d2} = 1.84666$ | $\nu_{d2} = 23.88$ |
| $r_4 = -235.7515$ | $d_4 = 16.094$ | | |
| $r_5 = \infty$ (Stop) | $d_5 = 1.000$ | | |
| $r_6 = 11.7987$ | $d_6 = 1.000$ | $n_{d3} = 1.80349$ | $\nu_{d3} = 30.40$ |
| $r_7 = 6.5321$ | $d_7 = 7.777$ | $n_{d4} = 1.67000$ | $\nu_{d4} = 57.33$ |
| $r_8 = -55.1213$ (Aspheric) | $d_8 = 10.503$ | | |
| $r_9 = -7.5141$ | $d_9 = 2.000$ | $n_{d5} = 1.55690$ | $\nu_{d5} = 48.55$ |
| $r_{10} = -13.2297$ (Aspheric) | | | |

Floating Spaces

| | | |
|---|---|---|
| OBJ | $\infty$ | $-500$ |
| $d_2$ | 13.233 | 12.844 |
| $d_8$ | 10.503 | 10.548 |

Aspherical Coefficients
1st surface $P = 1.0000$
$A_4 = 0.30796 \times 10^{-4}$
$A_6 = -0.70655 \times 10^{-7}$
$A_8 = 0.48647 \times 10^{-10}$
$A_{10} = -0.38393 \times 10^{-15}$ 2nd surface $P = 1.0000$
$A_4 = 0.47800 \times 10^{-4}$
$A_6 = 0.30958 \times 10^{-7}$
$A_8 = 0.33067 \times 10^{-9}$
$A_{10} = -0.10766 \times 10^{-11}$ 8th surface $P = 1.0000$
$A_4 = 0.40069 \times 10^{-4}$
$A_6 = -0.17837 \times 10^{-5}$
$A_8 = 0.65836 \times 10^{-7}$
$A_{10} = -0.10180 \times 10^{-8}$ 10th surface $P = 1.0000$
$A_4 = 0.63131 \times 10^{-4}$
$A_6 = 0.27381 \times 10^{-6}$
$A_8 = -0.21398 \times 10^{-11}$
$A_{10} = 0.17554 \times 10^{-10}$

Example 3

$f = 16.085, F_{NO} = 2.85, \omega = 53.37°$

| | | | |
|---|---|---|---|
| $r_1 = 42.7188$ (Aspheric) | $d_1 = 2.854$ | $n_{d1} = 1.69680$ | $\nu_{d1} = 56.47$ |
| $r_2 = 14.9358$ (Aspheric) | $d_2 = 12.229$ | | |
| $r_3 = 66.6448$ | $d_3 = 4.118$ | $n_{d2} = 1.72151$ | $\nu_{d2} = 29.24$ |
| $r_4 = -673.2170$ | $d_4 = 16.595$ | | |
| $r_5 = \infty$ (Stop) | $d_5 = 1.084$ | | |
| $r_6 = 12.9396$ | $d_6 = 1.000$ | $n_{d3} = 1.80518$ | $\nu_{d3} = 25.43$ |
| $r_7 = 7.8832$ | $d_7 = 8.576$ | $n_{d4} = 1.72916$ | $\nu_{d4} = 54.68$ |
| $r_8 = -100.9017$ (Aspheric) | $d_8 = 9.544$ | | |
| $r_9 = -7.7539$ | $d_9 = 2.000$ | $n_{d5} = 1.65016$ | $\nu_{d5} = 39.39$ |
| $r_{10} = -12.4647$ (Aspheric) | | | |

Floating Spaces

| | | |
|---|---|---|
| OBJ | $\infty$ | $-500$ |
| $d_2$ | 12.229 | 11.879 |
| $d_8$ | 9.544 | 9.608 |

Aspherical Coefficients
1st surface $P = 1.0000$
$A_4 = 0.30962 \times 10^{-4}$
$A_6 = -0.69992 \times 10^{-7}$
$A_8 = 0.50239 \times 10^{-10}$
$A_{10} = -0.34138 \times 10^{-14}$ 2nd surface $P = 1.0000$
$A_4 = 0.45148 \times 10^{-4}$
$A_6 = 0.73934 \times 10^{-8}$
$A_8 = 0.35367 \times 10^{-9}$
$A_{10} = -0.10573 \times 10^{-11}$ 8th surface $P = 1.0000$
$A_4 = 0.70958 \times 10^{-4}$
$A_6 = -0.69533 \times 10^{-6}$
$A_8 = 0.11157 \times 10^{-7}$
$A_{10} = -0.22664 \times 10^{-10}$ 10th surface $P = 1.0000$
$A_4 = 0.63206 \times 10^{-4}$
$A_6 = 0.27186 \times 10^{-6}$
$A_8 = -0.33124 \times 10^{-9}$
$A_{10} = 0.34942 \times 10^{-10}$

Example 4

$f = 18.05, F_{NO} = 3.5, \omega = 50.16°$

| | | | |
|---|---|---|---|
| $r_1 = 18.8617$ (Aspheric) | $d_1 = 5.059$ | $n_{d1} = 1.80440$ | $\nu_{d1} = 39.58$ |
| $r_2 = 8.5912$ | $d_2 = 5.568$ | | |
| $r_3 = 21.3355$ | $d_3 = 2.500$ | $n_{d2} = 1.80518$ | $\nu_{d2} = 25.43$ |
| $r_4 = 26.4212$ | $d_4 = 7.558$ | | |
| $r_5 = \infty$ (Stop) | $d_5 = 0.360$ | | |
| $r_6 = 9.5251$ | $d_6 = 2.392$ | $n_{d3} = 1.80518$ | $\nu_{d3} = 25.43$ |
| $r_7 = 6.1711$ | $d_7 = 3.975$ | $n_{d4} = 1.60300$ | $\nu_{d4} = 65.48$ |
| $r_8 = -20.0405$ (Aspheric) | $d_8 = 9.088$ | | |
| $r_9 = -6.4386$ | $d_9 = 2.000$ | $n_{d5} = 1.49700$ | $\nu_{d5} = 81.61$ |
| $r_{10} = -14.0232$ (Aspheric) | | | |

Floating Spaces

| | | |
|---|---|---|
| OBJ | $\infty$ | $-500$ |
| $d_2$ | 5.568 | 5.641 |
| $d_8$ | 9.088 | 9.081 |

Aspherical Coefficients
1st surface $P = 1.0000$
$A_4 = -0.31551 \times 10^{-5}$
$A_6 = -0.89212 \times 10^{-8}$
$A_8 = -0.93665 \times 10^{-10}$
$A_{10} = 0.16433 \times 10^{-12}$ 8th surface $P = 1.0000$
$A_4 = 0.16904 \times 10^{-3}$
$A_6 = 0.13085 \times 10^{-6}$
$A_8 = 0.20119 \times 10^{-8}$
$A_{10} = 0.51169 \times 10^{-9}$ 10th surface $P = 1.0000$
$A_4 = 0.40740 \times 10^{-4}$
$A_6 = -0.47577 \times 10^{-7}$
$A_8 = -0.11307 \times 10^{-8}$
$A_{10} = 0.30944 \times 10^{-10}$

Example 5

$f = 20.05, F_{NO} = 3.5, \omega = 47.17°$

| | | | |
|---|---|---|---|
| $r_1 = 28.8162$ (Aspheric) | $d_1 = 1.900$ | $n_{d1} = 1.62045$ | $\nu_{d1} = 38.12$ |
| $r_2 = 11.4888$ | $d_2 = 9.506$ | | |
| $r_3 = 72.1434$ | $d_3 = 2.500$ | $n_{d2} = 1.69680$ | $\nu_{d2} = 55.53$ |
| $r_4 = -94.9970$ | $d_4 = 9.540$ | | |
| $r_5 = \infty$ (Stop) | $d_5 = 1.540$ | | |
| $r_6 = 9.7367$ | $d_6 = 2.053$ | $n_{d3} = 1.80518$ | $\nu_{d3} = 25.43$ |
| $r_7 = 7.0012$ | $d_7 = 3.192$ | $n_{d4} = 1.48749$ | $\nu_{d4} = 70.21$ |
| $r_8 = -23.4907$ (Aspheric) | $d_8 = 10.770$ | | |
| $r_9 = -7.0641$ | $d_9 = 2.000$ | $n_{d5} = 1.68893$ | $\nu_{d5} = 31.08$ |
| $r_{10} = -15.9356$ (Aspheric) | | | |

-continued

Floating Spaces

| | | |
|---|---|---|
| OBJ | ∞ | −500 |
| $d_2$ | 9.056 | 9.522 |
| $d_8$ | 10.770 | 10.770 |

Aspherical Coefficients
1st surface

P = 1.0000
$A_4 = -0.12473 \times 10^{-4}$
$A_6 = -0.18729 \times 10^{-8}$
$A_8 = 0.43622 \times 10^{-10}$
$A_{10} = 0.31518 \times 10^{-13}$
8th surface P = 1.0000
$A_4 = 0.10234 \times 10^{-3}$
$A_6 = 0.24585 \times 10^{-6}$
$A_8 = -0.28007 \times 10^{-7}$
$A_{10} = 0.94508 \times 10^{-9}$
10th surface P = 1.0000
$A_4 = -0.10922 \times 10^{-4}$
$A_6 = 0.67658 \times 10^{-7}$
$A_8 = -0.24908 \times 10^{-8}$
$A_{10} = 0.13800 \times 10^{-10}$ Example 6

$f = 16.085, F_{NO} = 2.85, \omega = 53.37°$

| | | | |
|---|---|---|---|
| $r_1 = 52.448$ (Aspheric) | $d_1 = 3.559$ | $n_{d1} = 1.51728$ | $v_{d1} = 69.56$ |
| $r_2 = 12.4791$ (Aspheric) | $d_2 = 28.039$ | | |
| $r_3 = \infty$ (Stop) | $d_3 = 0.900$ | | |
| $r_4 = 12.0167$ | $d_4 = 4.807$ | $n_{d2} = 1.84666$ | $v_{d2} = 23.88$ |
| $r_5 = 6.6074$ | $d_5 = 6.895$ | $n_{d3} = 1.67790$ | $v_{d3} = 55.33$ |
| $r_6 = -71.6695$ (Aspheric) | $d_6 = 11.800$ | | |
| $r_7 = -9.5672$ | $d_7 = 2.000$ | $n_{d4} = 1.49700$ | $v_{d4} = 81.61$ |
| $r_8 = -13.9833$ (Aspheric) | | | |

Floating Spaces

| | | |
|---|---|---|
| OBJ | ∞ | −500 |
| $d_2$ | 28.039 | 27.519 |
| $d_8$ | 11.800 | 11.915 |

Aspherical Coefficients
1st surface

P = 1.0000
$A_4 = 0.34996 \times 10^{-4}$
$A_6 = -0.70740 \times 10^{-7}$
$A_8 = 0.34790 \times 10^{-10}$
$A_{10} = 0.28106 \times 10^{-13}$
2nd surface P = 1.0000
$A_4 = 0.46106 \times 10^{-4}$
$A_6 = 0.93818 \times 10^{-7}$
$A_8 = 0.11243 \times 10^{-8}$
$A_{10} = -0.46402 \times 10^{-11}$
6th surface P = 1.0000
$A_4 = 0.11463 \times 10^{-3}$
$A_6 = -0.32515 \times 10^{-6}$
$A_8 = 0.16769 \times 10^{-7}$
$A_{10} = -0.31560 \times 10^{-9}$
8th surface P = 1.0000
$A_4 = 0.46560 \times 10^{-4}$
$A_6 = 0.56073 \times 10^{-6}$
$A_8 = -0.61941 \times 10^{-8}$
$A_{10} = 0.31651 \times 10^{-10}$ Example 7

$f = 16.0, F_{NO} = 3.55, \omega = 53.50°$

| | | | |
|---|---|---|---|
| $r_1 = 32.1706$ (Aspheric) | $d_1 = 2.323$ | $n_{d1} = 1.48749$ | $v_{d1} = 70.21$ |
| $r_2 = 10.6939$ (Aspheric) | $d_2 = 23.441$ | | |
| $r_3 = \infty$ (Stop) | $d_3 = 0.900$ | | |
| $r_4 = 10.7198$ | $d_4 = 3.615$ | $n_{d2} = 1.80518$ | $v_{d2} = 25.43$ |
| $r_5 = 6.1085$ | $d_5 = 5.799$ | $n_{d3} = 1.65160$ | $v_{d3} = 55.53$ |
| $r_6 = -45.1276$ (Aspheric) | $d_6 = 9.973$ | | |
| $r_7 = -7.7057$ | $d_7 = 2.000$ | $n_{d4} = 1.49700$ | $v_{d4} = 53.20$ |
| $r_8 = -13.4686$ (Aspheric) | | | |

Floating Spaces

| | | |
|---|---|---|
| OBJ | ∞ | −500 |
| $d_2$ | 23.441 | 23.213 |
| $d_8$ | 9.973 | 9.975 |

Aspherical Coefficients
1st surface

P = 1.0000
$A_4 = 0.52312 \times 10^{-4}$
$A_6 = -0.15072 \times 10^{-6}$
$A_8 = 0.24601 \times 10^{-10}$
$A_{10} = 0.31847 \times 10^{-12}$
2nd surface P = 1.0000
$A_4 = 0.68036 \times 10^{-4}$
$A_6 = 0.42836 \times 10^{-7}$
$A_8 = 0.36268 \times 10^{-8}$
$A_{10} = -0.18914 \times 10^{-10}$
6th surface P = 1.0000
$A_4 = 0.13775 \times 10^{-3}$
$A_6 = -0.13791 \times 10^{-5}$
$A_8 = 0.86193 \times 10^{-7}$
$A_{10} = -0.20787 \times 10^{-8}$
8th surface P = 1.0000
$A_4 = 0.55436 \times 10^{-4}$
$A_6 = 0.30450 \times 10^{-6}$
$A_8 = -0.54491 \times 10^{-8}$
$A_{10} = 0.47004 \times 10^{-10}$ Example 8

$f = 20.050, F_{NO} = 2.88, \omega = 47.17°$

| | | | |
|---|---|---|---|
| $r_1 = 23.8109$ (Aspheric) | $d_1 = 12.020$ | $n_{d1} = 1.80100$ | $v_{d1} = 34.97$ |
| $r_2 = 9.5754$ | $d_2 = 16.964$ | | |
| $r_3 = \infty$ (Stop) | $d_3 = 0.900$ | | |
| $r_4 = 12.3405$ | $d_4 = 4.279$ | $n_{d2} = 1.84666$ | $v_{d2} = 23.88$ |
| $r_5 = 7.3893$ | $d_5 = 4.388$ | $n_{d3} = 1.65160$ | $v_{d3} = 58.52$ |
| $r_6 = -23.2374$ (Aspheric) | $d_6 = 11.898$ | | |
| $r_7 = -8.6983$ | $d_7 = 2.000$ | $n_{d4} = 1.49700$ | $v_{d4} = 81.61$ |
| $r_8 = -13.7022$ (Aspheric) | | | |

Floating Spaces

| | | |
|---|---|---|
| OBJ | ∞ | −500 |
| $d_2$ | 16.964 | 16.974 |
| $d_6$ | 11.898 | 11.915 |

Aspherical Coefficients
1st surface

P = 1.0000
$A_4 = -0.22315 \times 10^{-6}$
$A_6 = -0.69333 \times 10^{-8}$
$A_8 = 0.10829 \times 10^{-10}$
$A_{10} = -0.29832 \times 10^{-13}$
6th surface P = 1.0000
$A_4 = 0.96497 \times 10^{-4}$
$A_6 = 0.40701 \times 10^{-6}$ -continued $A_8 = -0.16259 \times 10^{-8}$
$A_{10} = -0.95513 \times 10^{-11}$
8th surface $P = 1.0000$
$A_4 = 0.79854 \times 10^{-4}$
$A_6 = -0.82164 \times 10^{-7}$
$A_8 = 0.62832 \times 10^{-10}$
$A_{10} = 0.15176 \times 10^{-10}$ Example 9

$f = 21.1, F_{NO} = 2.86, \omega = 45.71°$

| | | | |
|---|---|---|---|
| $r_1 = 38.2860$ (Aspheric) | $d_1 = 7.893$ | $n_{d1} = 1.49700$ | $\nu_{d1} = 81.61$ |
| $r_2 = 12.2307$ (Aspheric) | $d_2 = 24.020$ | | |
| $r_3 = \infty$ (Stop) | $d_3 = 0.900$ | | |
| $r_4 = 12.5107$ | $d_4 = 8.672$ | $n_{d2} = 1.65160$ | $\nu_{d2} = 58.52$ |
| $r_5 = -9.4910$ | $d_5 = 1.000$ | $n_{d3} = 1.62364$ | $\nu_{d3} = 36.54$ |
| $r_6 = -56.0766$ (Aspheric) | $d_6 = 6.636$ | | |
| $r_7 = -14.8521$ (Aspheric) | $d_7 = 8.879$ | $n_{d4} = 1.80518$ | $\nu_{d4} = 25.43$ |
| $r_8 = -32.7600$ | | | |

Floating Spaces

| OBJ | $\infty$ | $-500$ |
|---|---|---|
| $d_2$ | 24.020 | 23.750 |
| $d_6$ | 6.636 | 6.585 |

Aspherical Coefficients
1st surface $P = 1.0000$
$A_4 = 0.14559 \times 10^{-4}$
$A_6 = -0.57885 \times 10^{-7}$
$A_8 = 0.11807 \times 10^{-9}$
$A_{10} = -0.89517 \times 10^{-13}$
2nd surface $P = 1.0000$
$A_4 = 0.22572 \times 10^{-4}$
$A_6 = 0.30307 \times 10^{-6}$
$A_8 = -0.52885 \times 10^{-8}$
$A_{10} = 0.25601 \times 10^{-10}$
6th surface $P = -97.2562$
$A_4 = 0.27067 \times 10^{-4}$
$A_6 = 0.15532 \times 10^{-5}$
$A_8 = -0.93752 \times 10^{-8}$
$A_{10} = 0.12544 \times 10^{-9}$
7th surface $P = 1.0000$
$A_4 = -0.13304 \times 10^{-3}$
$A_6 = -0.22163 \times 10^{-5}$
$A_8 = 0.49802 \times 10^{-7}$
$A_{10} = -0.12215 \times 10^{-8}$ Example 10

$f = 20.05, F_{NO} = 3.6, \omega = 44.92°$

| | | | |
|---|---|---|---|
| $r_1 = 67.1433$ | $d_1 = 1.900$ | $n_{d1} = 1.49700$ | $\nu_{d1} = 81.61$ |
| $r_2 = 15.1994$ (Aspheric) | $d_2 = 32.539$ | | |
| $r_3 = 11.5686$ | $d_3 = 4.919$ | $n_{d2} = 1.78590$ | $\nu_{d2} = 44.19$ |
| $r_4 = 5.6481$ | $d_4 = 5.171$ | $n_{d3} = 1.60300$ | $\nu_{d3} = 65.48$ |
| $r_5 = -21.8800$ | $d_5 = 0.609$ | $n_{d4} = 1.75520$ | $\nu_{d4} = 27.51$ |
| $r_6 = -48.7502$ (Aspheric) | $d_6 = 1.000$ | | |
| $r_7 = \infty$ (Stop) | $d_7 = 15.361$ | | |
| $r_8 = -13.4149$ (Aspheric) | $d_8 = 1.500$ | $n_{d5} = 1.49700$ | $\nu_{d5} = 81.61$ |
| $r_9 = -34.1205$ | | | |

Floating Spaces

| OBJ | $\infty$ | $-500$ |
|---|---|---|
| $d_2$ | 32.539 | 32.475 |
| $d_7$ | 15.361 | 15.378 |

Aspherical Coefficients
2nd surface $P = 1.0000$
$A_4 = -0.22840 \times 10^{-5}$
$A_6 = 0.12264 \times 10^{-6}$
$A_8 = -0.90113 \times 10^{-9}$
$A_{10} = 0.28559 \times 10^{-11}$
6th surface $P = 1.0000$
$A_4 = 0.27182 \times 10^{-4}$
$A_6 = -0.20372 \times 10^{-5}$
$A_8 = 0$
$A_{10} = 0$
8th surface $P = 1.0000$
$A_4 = -0.44588 \times 10^{-4}$
$A_6 = -0.42431 \times 10^{-5}$
$A_8 = 0.73120 \times 10^{-7}$
$A_{10} = -0.51848 \times 10^{-9}$ Tabulated below are the values for conditions (1) to (3) throughout Examples 1 to 10.

| Example | $|f_1/f_2|$ | $|f_3/f_2|$ | $D_1/f$ |
|---|---|---|---|
| 1 | 3.264 | 2.105 | 1.049 |
| 2 | 3.273 | 2.023 | 1.0 |
| 3 | 3.592 | 2.2 | 1.032 |
| 4 | 2.461 | 2.048 | 0.419 |
| 5 | 6.283 | 1.187 | 0.476 |
| 6 | 1.809 | 3.974 | 1.743 |
| 7 | 2.156 | 2.592 | 1.465 |
| 8 | 2.130 | 3.676 | 0.846 |
| 9 | 2.490 | 2.683 | 1.138 |
| 10 | 1.889 | 2.151 | 1.623 |

Common knowledge has so far taught that an ultrawide-angle lens system is of very complicated construction. No symmetrical lens system having a large aperture ratio has been achieved whatsoever because of an increase in the number of lenses used and some limitation imposed on the aperture ratio. As can be seen from the foregoing, however, the present invention is the first to achieve an ultrawide-angle lens system comprising a reduced number of, or as small as 4 or 5, lenses by effective use of aspherical surfaces. Furthermore in the present invention, it is possible to make satisfactory correction for aberration variations upon focusing at a finite distance object point by use of a floating method involving the movement of a subordinate system, which is effected in combination with the movement of the entire system as carried out in the prior art.

The entirety of Jp-7-121635 filed may 19, 1995, from which priority under 35 USC 119 is claimed, is incorporated herein by reference:

What we claim is:

1. A wide-angle lens system comprising, in order from an object side:

a first lens group having a negative refracting power; and a third lens group having a negative refracting power, wherein said first lens group comprises at least one negative meniscus lens convex on the object side, said second lens group comprises one set of cemented lenses, said third lens group comprises at least one negative meniscus lens convex of an image side of said system, at least one aspherical surface is located in any one of said first, second, and third lens groups, the following conditions are satisfied:

$$1.0 < |f_1/f_2| < 12 \quad (1)$$
$$0.8 < |f_3/f_2| < 8 \quad (2)$$
$$0.2 < |D_1/f| < 3 \quad (3)$$

where $f_1$ is a focal length of the first group;
$f_2$ is a local length of the second lens group;
$f_3$ is a local length of the third lens group;
f is a local length the entire system; and
$D_1$ is a spacing between the first and the second lens group,
wherein
said first lens group comprises one negative meniscus lens convex on the object side and a positive lens between which an air lens is interposed,
said second lens group comprises one set of cemented lenses consisting of a negative lens and a positive lens, and
said third lens group comprises one negative meniscus lens convex on an image side.

2. A wide-angle lens comprising, in order from an object side:
a first lens group having a negative refracting power;
a second lens group having a positive refracting power; and
a third lens group having a negative refracting power, wherein
said first lens group comprises at least one negative meniscus lens that is convex on the object side,
said second lens group comprises an aperture stop and at least one set of cemented lenses,
said third lens group comprises at least one negative meniscus lens that is convex on an image side, and
when focusing is to be effected from an object at infinity on a short distance object, the wide-angle lens system is moved toward the object side while only spacing between the respective lens groups or an air space in a given lens group is varied, thereby reducing aberration variations.

3. A wide-angle lens comprising, in order from an object side:
a first lens group having a negative refracting power;
a second lens group having a positive refracting power; and
a third lens group having a negative refracting power, wherein
said first lens group comprises at least one negative meniscus lens convex on the object side,
said second lens group comprises an aperture stop and at least one set of cemented lenses,
said third lens group comprises at least one negative meniscus lens convex on an image side, and, wherein
when focusing is to be effected from an object at infinity on a short distance object, the entire system is moved toward the object side while an air space in the first lens group and the spacing between the second and third lens groups are varied.

4. A wide-angle lens system as recited in claim 2, wherein:
when focusing is to be effected from an object at infinity on a short distance object, the entire system is moved toward the object side while the spacing between the first and second lens groups and the spacing between the second and third lens groups are varied.

5. A wide-angle lens comprising, in order from an object side:
a first lens group having a negative refracting power;
a second lens group having a positive refracting power; and
a third lens group having a negative refracting power, wherein
said first lens group comprises at least one negative meniscus lens convex on the object side,
said second lens group comprises an aperture stop and at least one set of cemented lenses,
said third lens group comprises at least one negative meniscus lens convex on an image side, and, wherein
when focusing is to be effected from an object at infinity on a short distance object, the entire system is moved toward the object side while only the spacing between the first and second lens groups is varied.

* * * * *

UNITED STATES PATENT AND TRADEMARK OFFICE
CERTIFICATE OF CORRECTION

PATENT NO. : 5,808,808
DATED : September 15, 1999
INVENTOR(S) : YAMANASHI

It is certified that error appears in the above-identified patent and that said Letters Patent is hereby corrected as shown below:

Column 20, line 58 (= line 3 of claim 1), delete "and" and between lines 58 & 59 insert as a paragraph --a second lens group having a positive refracting process; and--.

Column 21, printed lines 8,9,10, read "local" as --focal--

Signed and Sealed this

Fourteenth Day of September, 1999

Attest:

Attesting Officer

Q. TODD DICKINSON

Acting Commissioner of Patents and Trademarks